US012726299B2

(12) United States Patent
Atungsiri

(10) Patent No.: US 12,726,299 B2
(45) Date of Patent: Sep. 1, 2026

(54) INFRASTRUCTURE EQUIPMENT, COMMUNICATIONS DEVICES AND METHODS

(71) Applicant: Sony Group Corporation, Tokyo (JP)

(72) Inventor: Samuel Asangbeng Atungsiri, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 695 days.

(21) Appl. No.: 18/014,474

(22) PCT Filed: Jul. 26, 2021

(86) PCT No.: PCT/EP2021/070900

§ 371 (c)(1),
(2) Date: Jan. 5, 2023

(87) PCT Pub. No.: WO2022/023289

PCT Pub. Date: Feb. 3, 2022

(65) Prior Publication Data

US 2023/0224103 A1 Jul. 13, 2023

(30) Foreign Application Priority Data

Jul. 27, 2020 (EP) .................................... 20188004

(51) Int. Cl.
*H04L 5/00* (2006.01)
*H04L 25/02* (2006.01)

(52) U.S. Cl.
CPC ............ *H04L 5/0012* (2013.01); *H04L 5/001* (2013.01); *H04L 25/0218* (2013.01); *H04L 25/0224* (2013.01)

(58) Field of Classification Search
CPC ... H04L 5/0012; H04L 5/001; H04L 25/0218; H04L 25/0224
See application file for complete search history.

(56) References Cited

U.S. PATENT DOCUMENTS

2018/0074207 A1 3/2018 Marmet et al.
2020/0145866 A1* 5/2020 Onggosanusi ....... H04B 7/0617
2021/0359806 A1* 11/2021 Levitsky ............... H04L 5/0048

FOREIGN PATENT DOCUMENTS

WO 2021/094119 A1 5/2021
WO 2021/190870 A1 9/2021

OTHER PUBLICATIONS

Teranishi et al. "Precise Modeling Suitable for Control System Design based on Impulse Response", 2018 IEEE 15th International Workshop on Advanced Motion Control (AMC), IEEE, Mar. 9, 2018, pp. 485-490. (Year: 2018).*

(Continued)

*Primary Examiner* — Tonia L Dollinger
(74) *Attorney, Agent, or Firm* — XSENSUS LLP

(57) ABSTRACT

Infrastructure equipment forming part of a wireless communications network configured to receive data from a communications device via a communications channel between the infrastructure equipment and the communications device. The infrastructure equipment comprises circuitry configured to receive, from the communications device, a request for a resource allocation, to receive one or more reference symbols from the communications device, to estimate based on the received reference symbols, for each of a plurality of resource units, RUs, of the communications channel, a signal to interference and noise ratio, SINR, sequence of the communications channel, and to perform a first transform followed by a second transform on the SINR sequence to produce a cepstrum of the SINR sequence, the second transform being an inverse of the first transform, and to encode and to transmit the cepstrum to the communications device.

20 Claims, 16 Drawing Sheets

(56) References Cited

OTHER PUBLICATIONS

International Search Report and Written Opinion mailed on Nov. 5, 2021, received for PCT Application No. PCT/EP2021/070900, filed on Jul. 26, 2021, 12 pages.
3GPP, "3rd Generation Partnership Project; Technical Specification Group Radio Access Network; NR; NR and NG-RAN Overall Description;Stage 2", Release 15, 3GPP TS 38.300 V15.2.0, Jun. 2018, pp. 1-87.
Childers et al., "The Cepstrum: A guide to processing", Proceedings of the IEEE, vol. 65, No. 10, Oct. 1977, pp. 1428-1443.
Elshamy et al. "Instantaneous A Priori SNR Estimation by Cepstral Excitation Manipulation", IEEE/ACM Transactions on Audio, Speech, and Language Processing, vol. 25, No. 8, Aug. 2017, pp. 1592-1605.
Robert M. Gray, "Vector Quantization", IEEE ASSP Magazine, Apr. 1984, 26 pages.
Holma et al., "LTE for UMTS OFDMA and SC-FDMA based radio access", John Wiley and Sons, 2009, 232 pages.
Teranishi et al., "Precise modeling suitable for control system design based on impulse response", 2018 IEEE 15th International Workshop on Advanced Motion Control (AMC) Mar. 9, 2018, pp. 485-490.

* cited by examiner

INFRASTRUCTURE EQUIPMENT, COMMUNICATIONS DEVICES AND METHODS

CROSS-REFERENCE TO RELATED APPLICATIONS

The present application is based on PCT filing PCT/EP2021/070900, filed Jul. 26, 2021, which claims the Paris Convention priority from European patent application number EP 20188004.4, filed Jul. 27, 2020, the contents of each are hereby incorporated by reference.

BACKGROUND

Field of Disclosure

The present disclosure relates to communications devices, infrastructure equipment and methods for the transmission and reception of data in a wireless communications network and for the dynamic and adaptive generation of waveforms for the transmission of that data in accordance with channel conditions.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

The increasing use of different types of communications devices associated with different traffic profiles gives rise to new challenges for efficiently handling communications in wireless telecommunications systems that need to be addressed.

SUMMARY OF THE DISCLOSURE

The present disclosure can help address or mitigate at least some of the issues discussed above as defined in the appended claims.

At least some embodiments of the present technique can provide an infrastructure equipment. The infrastructure equipment forms part of a wireless communications network configured to receive data from a communications device via a communications channel between the infrastructure equipment and the communications device. The infrastructure equipment comprises transceiver circuitry to transmit signals to and to receive signals from the communications device, and controller circuitry. The controller circuitry is configured in combination with the transceiver circuitry to receive, from the communications device, a request for a resource allocation within which the communications device is to transmit data to the infrastructure equipment, to receive one or more reference symbols from the communications device, to estimate based on the received reference symbols, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, to perform a first transform followed by a second transform on the SINR sequence to produce a cepstrum of the SINR sequence, the second transform being an inverse of the first transform, and to encode and to transmit the cepstrum to the communications device.

Other embodiments of the present technique can provide a communications device. The communications device forms part of a wireless communications network configured to transmit data to an infrastructure equipment via a communications channel between the communications device and the infrastructure equipment. The communications device comprises transceiver circuitry to transmit signals to and to receive signals from the infrastructure equipment, and controller circuitry. The controller circuitry is configured in combination with the transceiver circuitry to determine that the communications device has data to transmit to the infrastructure equipment, to transmit, to the infrastructure equipment, a request for a resource allocation within which the communications device is to transmit the data to the infrastructure equipment, to transmit one or more reference symbols to the infrastructure equipment, the reference symbols being for use by the infrastructure equipment in estimating, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, and to receive, from the infrastructure equipment, an encoded cepstrum of the SINR sequence, the cepstrum having been produced by the infrastructure equipment by performing a first transform followed by a second transform on the SINR sequence, the second transform being an inverse of the first transform.

Further embodiments of the present technique can provide an infrastructure equipment. The infrastructure equipment forms part of a wireless communications network configured to transmit data to a communications device via a communications channel between the infrastructure equipment and the communications device. The infrastructure equipment comprises transceiver circuitry to transmit signals to and to receive signals from the communications device, and controller circuitry. The controller circuitry is configured in combination with the transceiver circuitry to determine that the infrastructure equipment has data to transmit to the communications device, to transmit one or more reference symbols to the communications device, the reference symbols being for use by the communications device in estimating, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, and to receive, from the communications device, an encoded cepstrum of the SINR sequence, the cepstrum having been produced by the communications device by performing a first transform followed by a second transform on the SINR sequence, the second transform being an inverse of the first transform.

Yet further embodiments of the present technique can provide a communications device. The communications device forms part of a wireless communications network configured to transmit data to an infrastructure equipment via a communications channel between the communications device and the infrastructure equipment. The communications device comprises transceiver circuitry to transmit signals to and to receive signals from the infrastructure equipment, and controller circuitry. The controller circuitry is configured in combination with the transceiver circuitry to receive one or more reference symbols from the infrastructure equipment, to estimate based on the received reference symbols, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, to perform a first transform followed by a second transform on the SINR sequence to produce a cepstrum of the SINR sequence, the second transform being an inverse of the first transform, and to encode and to transmit the cepstrum to the infrastructure equipment.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
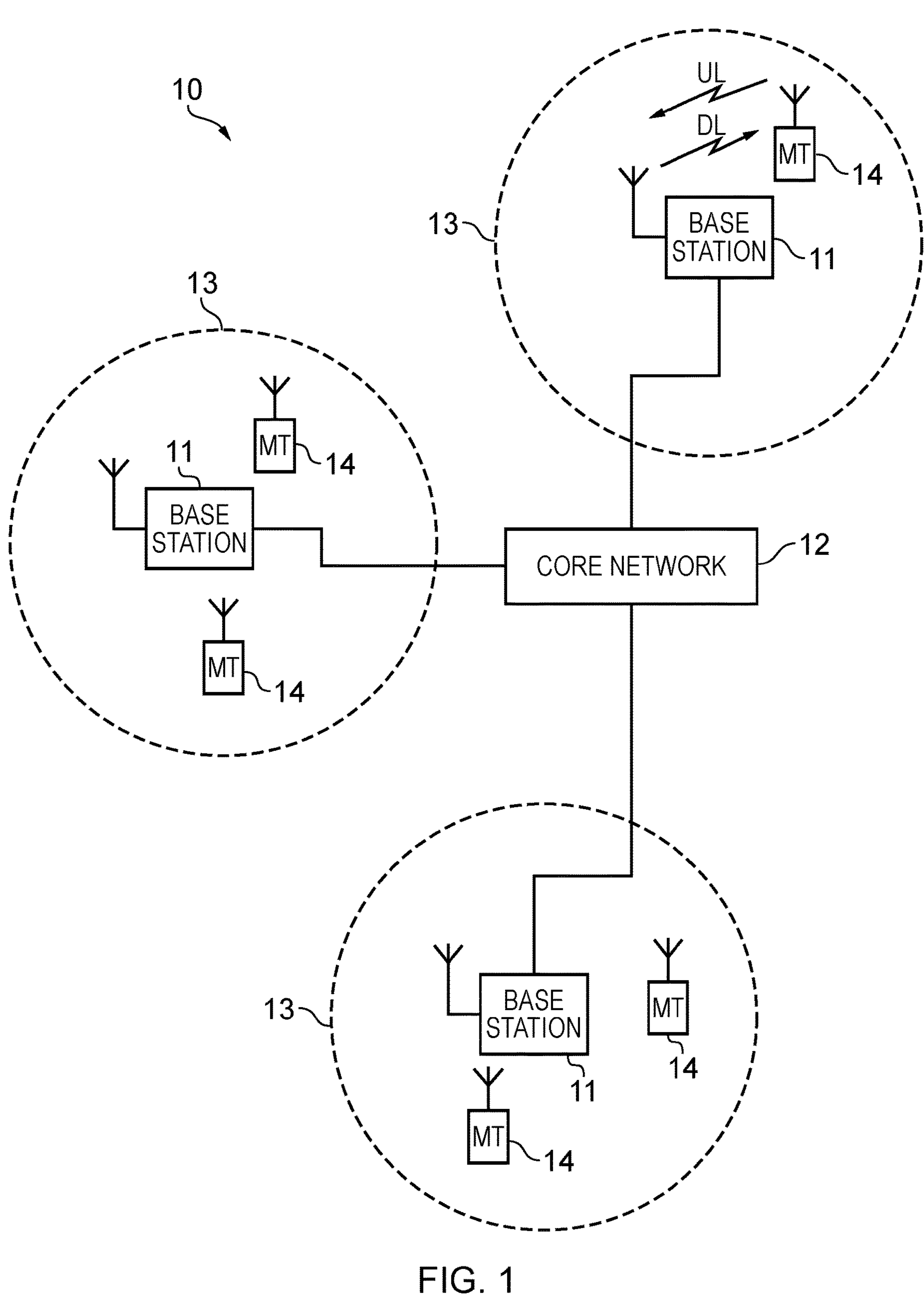
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as BSs/transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present invention can find application with advanced wireless communications systems such as those referred to as 5G or New Radio (NR) Access Technology. The use cases that are considered for NR include:

Enhanced Mobile Broadband (eMBB);

Massive Machine Type Communications (mMTC);

Ultra Reliable & Low Latency Communications (URLLC); and

Enhanced Ultra Reliable & Low Latency Communications (eURLLC).

eMBB services are characterised by high capacity with a requirement to support up to 20 Gb/s. URLLC service requires that a packet at layer 2 is transmitted with a latency that is less than 0.5 ms to 1 ms with reliability of 99.999% to 99.9999%.

The elements of the wireless access network shown in FIG. 1 may be equally applied to a 5G new RAT configuration, except that a change in terminology may be applied as mentioned above.

Figure 2:
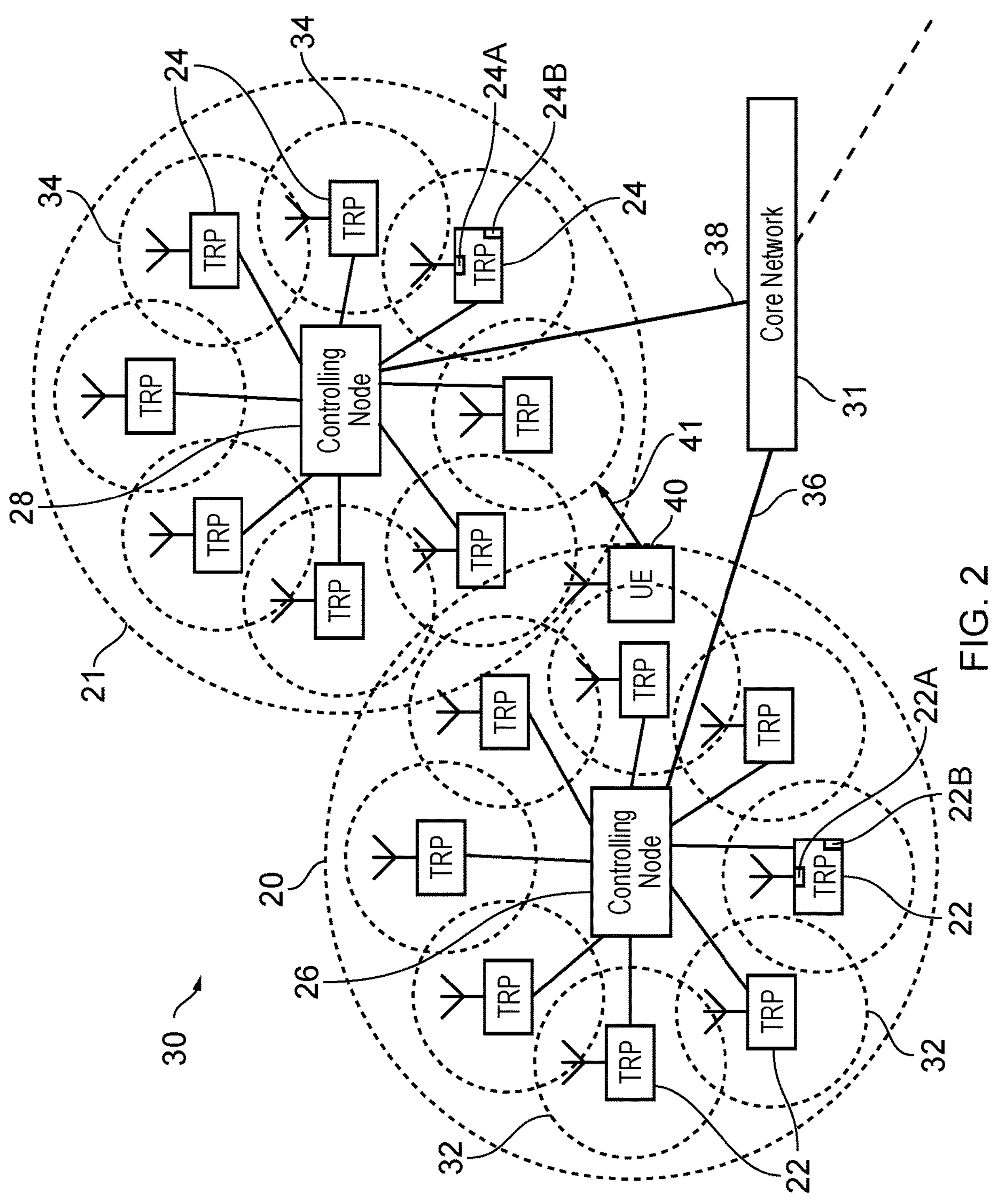
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit, CU) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units (DUs) 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22*a*, 24*a* for transmission and reception of wireless signals and processor circuitry 22*b*, 24*b* configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1, and so these terms (as well as indeed eNodeB, eNB, gNodeB, gNB, etc.) are interchangeable. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (DU/TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though it may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific RAN wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Figure 3:
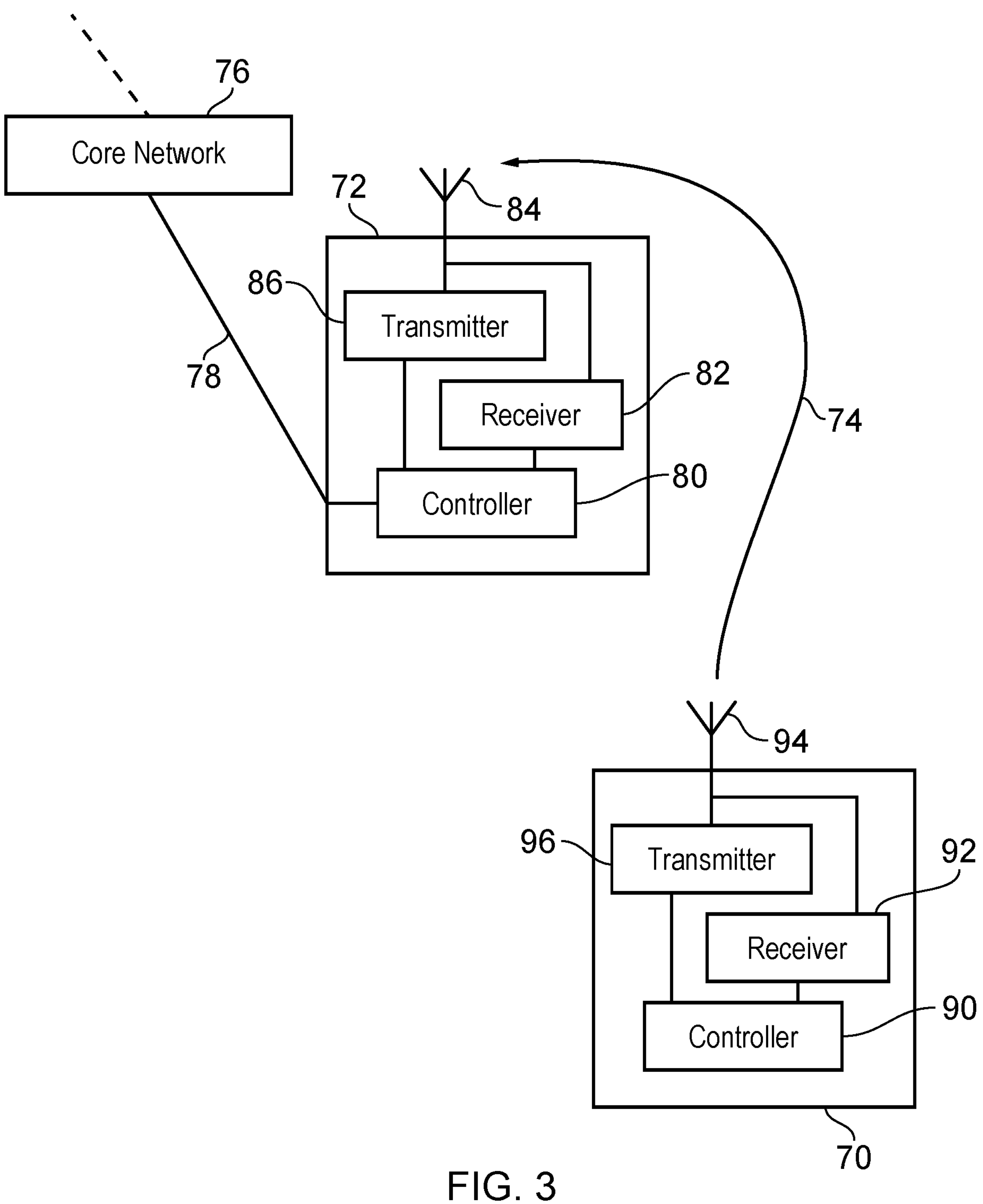
FIG. 3 is a schematic block diagram of an example infrastructure equipment and communications device configured in accordance with example embodiments of the present disclosure.

A more detailed illustration of a communications device 70 and an example network infrastructure equipment 72, which may be thought of as a base station/eNB/gNB 11 or a combination of a controlling node 26, 28 and TRP 22, 24, is presented in FIG. 3. As shown in FIG. 3, the communications device 70 is shown to transmit uplink data to the infrastructure equipment 72 via resources of a wireless access interface as illustrated generally by an arrow 74. The communications device 70 may also receive downlink data transmitted by the infrastructure equipment 72 (not shown). As with FIGS. 1 and 2, the infrastructure equipment 72 is connected to a core network 76 (which may correspond to the core network 12 of FIG. 1 or the core network 31 of FIG. 2) via an interface 78 to a controller 80 of the infrastructure equipment 72. The infrastructure equipment 72 may additionally be connected to other similar infrastructure equipment by means of an inter-radio access network node interface, not shown in FIG. 3.

The infrastructure equipment 72 includes a receiver 82 connected to an antenna 84 and a transmitter 86 connected to the antenna 84. Correspondingly, the communications device 70 includes a controller 90 connected to a receiver 92 which receives signals from an antenna 94 and a transmitter 96 also connected to the antenna 94. The controller 80 is configured to control the infrastructure equipment 72 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 80 may comprise circuitry which is suitably configured/programmed to provide the desired functionality using conventional programming/configuration techniques for equipment in wireless telecommunications systems. The transmitter 86 and the receiver 82 may comprise signal processing and radio frequency filters, amplifiers and circuitry in accordance with conventional arrangements. The transmitter 86, the receiver 82 and the controller 80 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 72 will in general comprise various other elements associated with its operating functionality. Correspondingly, the controller 90 of the communications device 70 is configured to control the transmitter 96 and the receiver 92 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 90 may comprise circuitry which is suitably configured/programmed to provide the desired functionality using conventional programming/configuration techniques for equipment in wireless telecommunications systems. Likewise, the transmitter 96 and the receiver 92 may comprise signal processing and radio frequency filters, amplifiers and circuitry in accordance with conventional arrangements. The transmitter 96, receiver 92 and controller 90 are schematically shown in FIG. 3 as separate elements for ease of representation. However, it will be appreciated that the functionality of these elements can be provided in various different ways, for example using one or more suitably programmed programmable computer (s), or one or more suitably configured application-specific integrated circuit(s)/circuitry/chip(s)/chipset(s).

As will be appreciated the communications device 20 will in general comprise various other elements associated with its operating functionality, for example a power source, user interface, and so forth, but these are not shown in FIG. 3 in the interests of simplicity. The controllers 80, 90 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Figure 4:
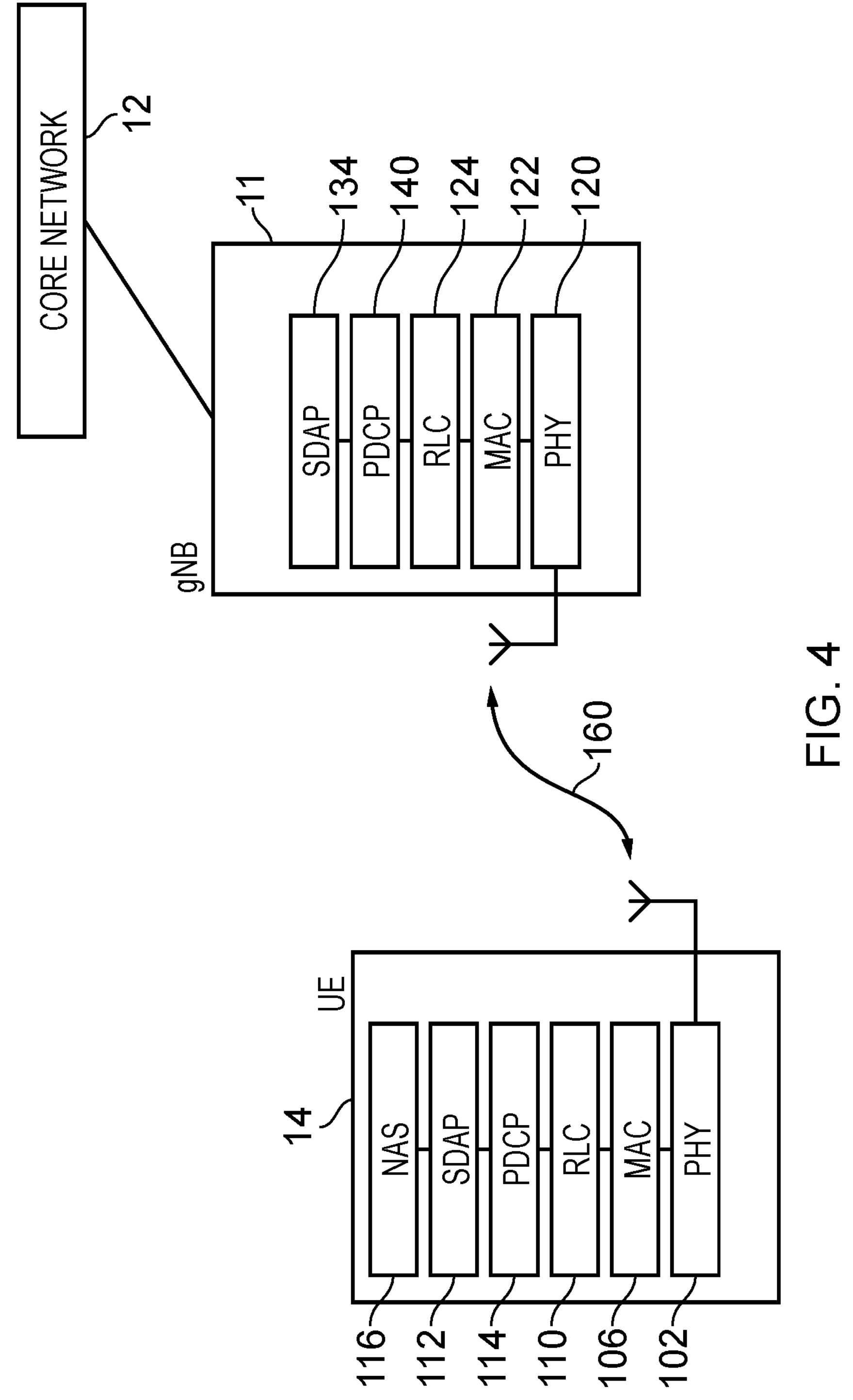
FIG. 4 is a block diagram showing logical protocol entities within a communications device and infrastructure equipment which may be configured to operate in accordance with example embodiments of the present technique.

FIG. 4 is a block diagram showing logical protocol entities within a communications device 14 and the infrastructure equipment 11 which may be configured to operate in accordance with example embodiments of the present technique. The communications device 14 may broadly correspond to the communications device 70 illustrated in FIG. 3 and described above. The infrastructure equipment 11 may broadly correspond to the infrastructure equipment 72 illustrated in FIG. 3 and described above.

Protocol entities may be characterised by functions which they provide to other protocol entities. For example, a physical layer (PHY) protocol entity 102 may control the transmitter 96 and receiver 92 to transmit and receive signals representing data on the wireless access interface. The PHY protocol entity 102 may thus provide an encoding and modulation function for data transmission, and a demodulation and decoding function for data reception. The PHY protocol entity 102 may provide these services to a medium access control (MAC) protocol entity 106 which in turn provides services to a radio link control (RLC) protocol entity 110. The RLC entity 110 interacts with a packet data convergence protocol (PDCP) entity 114, which in turn receives data for transmission from, and passes received data to, a non-access stratum (NAS) layer 116. The NAS layer may be an example of an 'upper layer', with respect to the access stratum (AS) layer comprising the PDCP protocol entity 114 and lower layer protocol entities. In addition, an SDAP (Service Data Adaptation Protocol) protocol entity 112, may reside on top of (i.e. at a higher logical layer than) the PDCP protocol entity 114. Data may be communicated between the communications device 14 and the infrastructure equipment 11 via a wireless access interface 160.

The infrastructure equipment 11 has an RLC entity 124 which has as a peer the RLC entity 110 of the communications device 14 for each radio bearer. The infrastructure equipment 11 has a MAC protocol entity 122 being the peer of the corresponding MAC entity 106 of the communications device 14, and a PHY entity 120 being a peer of the corresponding PHY entity 102 of the communications device 14. At the PDCP protocol layer, the PDCP entity 114 of the communications device 14 has as its peer a PDCP entity 140 of the infrastructure equipment 11. Similarly an SDAP entity 134 of the infrastructure equipment 11 is the peer of the communications device's SDAP entity 116.

Each protocol entity in the communications device 14 may be implemented by the controller 90 in combination with the receiver 92 and transmitter 70 of the communications device. Similarly, each protocol entity in the infrastructure equipment 11 may be implemented by the controller 80 in combination with the receiver 82 and transmitter 86 of the infrastructure equipment.

Orthogonal Frequency Division Multiplexing (OFDM)

Figure 5:
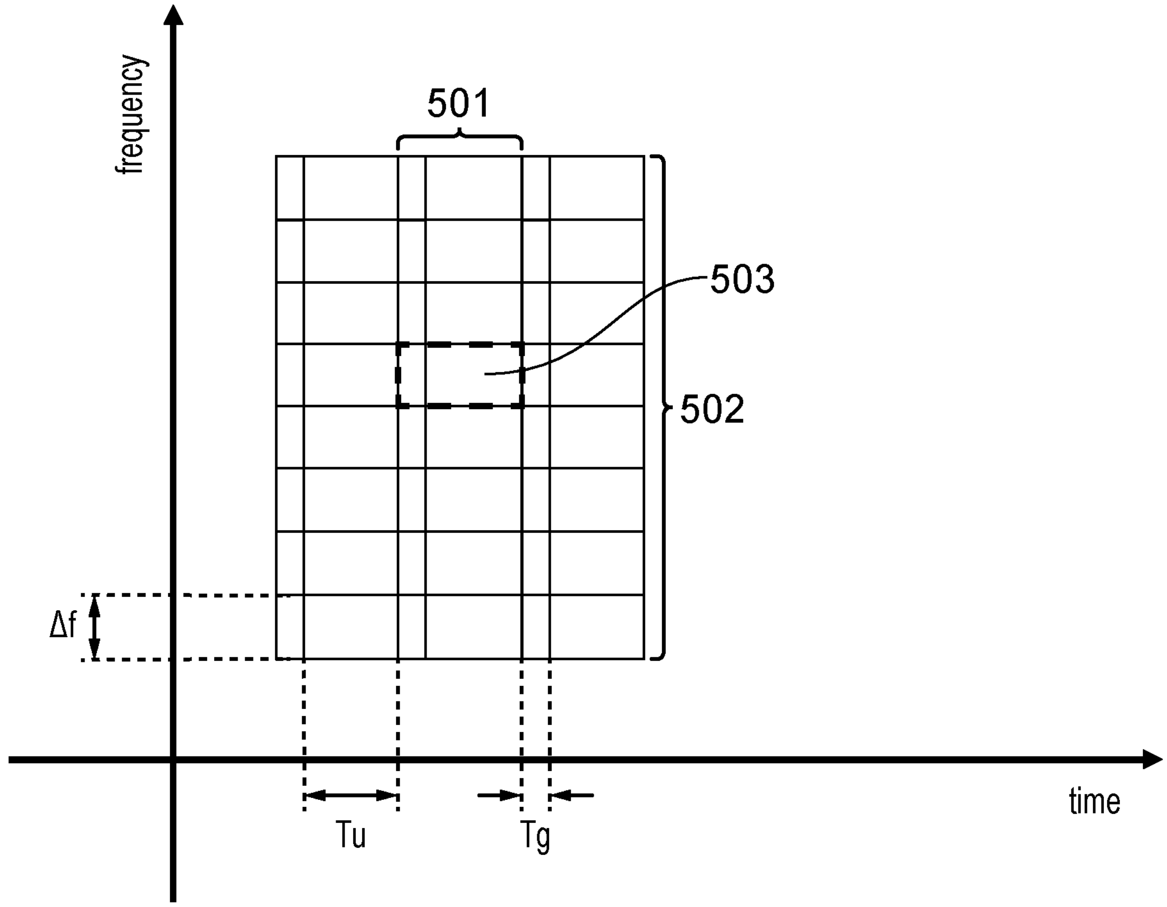
FIG. 5 shows an example of an orthogonal frequency division multiplexing (OFDM) frequency-time grid.

Many wireless and mobile communication systems such as WiFi (802.11xx), 4G (LTE) and 5G (NR) systems employ orthogonal frequency division multiplexing (OFDM) at the physical layers. FIG. 5 illustrates an example OFDM frequency-time grid. In OFDM systems, the radio or component carrier is split in frequency into many narrowband subcarriers of bandwidth Δf known as the subcarrier spacing. Each subcarrier is then modulated with m bits of information for a short duration Tu=1/Δf—known as the OFDM symbol duration using for example, a quadrature amplitude modulation (QAM) with an alphabet size of $2^m$. At the end of the OFDM symbol duration, the modulating QAM symbol for each of the subcarriers is changed and another OFDM symbol 501 built. An OFDM symbol 501 of duration Tu is therefore comprised of Nu subcarriers 502 each with subcarrier bandwidth of Δf Hz. The physical layer signal can therefore be conceived of as a time-frequency grid of OFDM symbols 501 each of Nu subcarriers 502 and a duration Tu as illustrated in FIG. 5. In wireless systems utilising physical layer signals such as that illustrated by FIG. 5, a guard interval or cyclic prefix of duration Tg much less than the OFDM symbol duration Tu is inserted at the start of each OFDM symbol 501 to help mitigate inter-symbol interference at the receiver between adjacent OFDM symbols 501 arising from multipath propagation. One cell in the grid 503—a subcarrier of a given OFDM symbol 501 is often referred to as a resource element (RE) and can be used to carry information such as one point of a given QAM constellation.

Mobile communications link layer capacity is measured in at least two ways. One measure is throughput that measures the proportion of MAC transmitted packets that are successfully received by the receiver. Mobile communication MAC layers employ HARQ—to improve the probability that a given packet will ultimately be received successfully. In this, the systems incorporate feedback from the receiver to the transmitter to inform the transmitter when a given transmission of a packet was not successful. This causes the transmitter to retransmit the MAC packet, wait for feedback from the receiver, retransmit, and wait again until the receiver confirms successful reception. Often, a limit is set for the number of allowed retransmissions. When this limit is exceeded, the transmitter marks the packet as lost and stops further retransmission of the said packet. Such a packet is then counted amongst the proportion that were not successfully received. Another measure of link layer capacity is bit rate. This counts the number of transmitted bits that are successfully received over a given time. Thus, in a system in which every MAC packet is successfully received but always after one retransmission, the throughput (as the proportion of successfully transmitted packets) is 100% but the bit rate is only 50% of the bit rate of the system compared to a situation in which every packet was successfully received without the need for a retransmission. In all wireless and mobile communication systems, the link layer design goal is to maximise both forms of throughput measures.

Link Adaptation

The lower layers (datalink and physical layers) of a mobile communication system are designed to create a radio waveform used for conveying data between a transmitter and receiver given some expected radio propagation conditions between the communicating gNB and the UE. In traditional link-layer designs, these layers are designed to allow the radio-communication system to cope with a given degree of radio propagation impairment. The success of mobile communication systems over the last few decades has been mainly due to the adoption of link adaptation that helps to maximise the throughput. In mobile communication systems such as 3G, 4G and 5G, the link-layer is designed with many choices for the forward error correction (FEC) code rates, modulation constellations, waveform type, transmit power levels. These can be jointly selected into sets of transmission parameters. Each set can be thought of as a parametrisation for the generation of the transmitted signal resulting from the joint choices that make the set. A given set is expected to generate a waveform or signal for transmission that is different from what another set would generate. Therefore, a deliberate choice can be made of a particular set of transmission parameters with the expectation that it would generate a transmission signal that is somehow more suitable for a prevailing set of radio channel propagation conditions than another set.

This method of designing link-layers is rather long-winded and laborious because it is difficult to deliberately determine the set of choices for all the configuration parameters. This is firstly, and especially, because the process of choosing between particular communication signal processing techniques such as FEC coding schemes (Low Density Parity Check (LDPC) codes, Turbo codes, or Polar codes, for example) is not trivial. Secondly, this is because even after a particular communication signal processing technique has been chosen, deciding on the set of possible configurations of the chosen technique that have to be designed and standardised is also an onerous process. As an example, if only the FEC is considered, then the radio communication system designer may have to first choose the FEC scheme (LDPC, Turbo or Polar codes etc.), then having chosen the FEC scheme, would need to then decide what block sizes and code rates to support etc. before proceeding to a similar process for modulation constellations etc.

Assuming that the radio-communication system has been designed already, such a system design has already chosen a coding scheme. In addition, it supports a designed number of possible codeword block sizes, a designed number of code rates per block size, a designed number of modulation constellations etc. Link adaptation allows the UE and gNB to work together to determine automatically:

1. the prevailing radio propagation conditions that will affect the transmitted data; and
2. the most appropriate set of link-layer configuration parameters (block size, code rate, modulation constellation etc.) to use so as to maximise throughput and/or transmission resource utilisation for the transmitted data within target reliability and/or latency under the prevailing radio propagation conditions.

This choice of an appropriate set of link-layer configuration parameters is also not trivial as it presents a somewhat multi-dimensional problem with the decision depending for example on the amount of data needing to be transmitted and the prevailing radio propagation channel conditions etc. Link adaptation in 4G and 5G systems is limited to the selection of a configuration from amongst a set of designed choices. For link adaptation of the DL, the UE measures channel quality parameters on the reception of reference signals transmitted by the BS. The channel quality is then signalled to the BS as a channel quality indicator (CQI) or in general, a channel strength indicator (CSI) report that can be either narrowband or wideband depending on the bandwidth of the reference signals used for its measurement. Based on this CQI or CSI report from the UE, the BS can adapt its DL transmissions to maximise throughput. Similarly, for the UL the BS measures channel quality parameters from reception of sounding reference signals (SRS) transmitted by the UE and uses the results of these measurements to instruct the UE how to adapt UL transmissions to maximise throughput. In 4G and 5G systems, since the FEC type for data channels is fixed, link adaptation therefore only involves the selection from a set of possible transmission block sizes (TBS), FEC code rates and modulation constellations—i.e. the modulation and coding scheme (MCS). Transmit power can also be thought of as an aspect of link adaptation. In such 4G and 5G systems the performance of the link-layer for a given resource allocation (using the two throughput measures explained above) is limited by the radio channel propagation conditions. Firstly, multipath propagation results in frequency selective fading whilst co-channel and adjacent channel interference from transmissions by other base stations and/or terminal devices (UEs) add to the noise. All of these have the effect of reducing the signal to interference and noise power ratio (SINR) of the channel. Secondly, mobility of the UEs and/or objects around the UE or base station further results in time variation of the channel.

For optimum performance, link-layer transmissions in a radio-communication system are supposed to be carefully adapted to the prevailing radio propagation conditions between the transmitter and receiver. As described above, dynamic link adaptation in existing 4G and 5G systems is limited to a selection of an MCS configuration from amongst the set of designed choices. Firstly, this choice is typically sub-optimal because there is a finite set of configurations to choose from and secondly, there may be propagation conditions for which none of the existing choices is optimum. The reason for this latter point is that during the link-layer design phase it is not possible to consider all the possible radio propagation conditions that the system would ever be used for. Thirdly, determining and signalling the prevailing radio propagation conditions during operation is not a trivial task either. The CQI used in 4G and 5G systems is too much of a coarse indicator addressing mostly the signal to interference and noise ratio (SINR)-related propagation conditions. Other relevant radio propagation conditions may include characteristics such as fading loss, time/frequency selectivity, channel delay spread, Doppler frequency spread, noise, interference etc. If all these radio channel propagation attributes were assessed, link-adaptation can be more granular and could entail changing any of the code rate, modulation constellation, transmission power, waveform, the number of transmit antennas, frequency hopping pattern, TBS etc.

For a fixed radio communication system in which both the BS and the terminals are stationary, the radio propagation conditions are dominated by the geography of the general location of the BS. The most optimum link-layer is one designed by taking into account the dominant radio propagation conditions arising from the geography of the given BS environment. For a mobile communication system however, the UEs move and so the propagation conditions change in accordance with the UEs position within the coverage area of the base station (eNodeB or gNodeB), although these are still significantly influenced by the geography of the area that surrounds the base station. In general, therefore, the range of radio propagation conditions between the base station and UE are influenced by the geography of the surrounding area and this geography is of course different from base station to base station. For example, a BS next to a motorway will likely serve many high speed UEs compared to a BS located in a built-up residential area. The signal received by UEs from a BS next to a mountain or high-rise buildings will be more frequency selective due to multipath propagation than from a BS located in the middle of a flat plain with only low-rise or no buildings.

In accordance with embodiments of the present technique as described herein, a multi-carrier transmission system is assumed with the intention of using a single tap or zero-forcing channel equaliser so as to ease analysis but the equivalent analysis can also be carried out for a single carrier transmission system or indeed a multi-carrier system with other types of receivers. In a multi-carrier transmission system based for example on OFDM such as LTE and NR, for a given OFDM symbol, the propagation channel combined with transmitter and receiver degradations can be described as:

$$B(k) = H(k)e^{j(w_D + w_O)} + N(k)$$

where:

$w_D$ is the Doppler frequency shift in radians per second due to relative movement between the transmitter and the receiver;

$w_O$ is the combined transmitter and receiver frequency offsets in radians per second; and N(k) is the combined noise and interference from all sources impinging on subcarrier k The channel transfer function H (k) can be further expressed as:

$$H(k) = |H(k)|e^{j(\Delta_k + k\emptyset)}$$

where:

$\Delta_k$ is the subcarrier phase shift due to the channel;

$\emptyset$ is the phase slope due to any timing offset; and

|H(k)| is the amplitude fading coefficient of subcarrier k shaped by frequency selectivity due to multipath propagation.

Assuming all these quantities except for N(k) (which is ignored for now) are known by the receiver, then the effect of the channel on the received signal R(k) can be reversed by multiplying R(k) by Z(k) defined as:

$$Z(k) = \frac{1}{|H(k)|}e^{-j(\Delta_k + k\emptyset + w_D + w_O)}$$

A situation can therefore be envisaged in which if the transmitter knew that its current transmission will traverse a channel whose transfer function is B(k), it could pre-distort its transmissions D(k) by Z(k) such that the received signal R(k) would then be given by:

$$R(k) = D(k)B(k)Z(k)$$

If the noise term N(k) is ignored, then R(k)=D(k) since B(k)Z(k)=[1].

The effect of the noise can be taken into account by choosing each D (k) from an alphabet of transmission symbols whose size is such that the expected decoding performance can be achieved with the signal to interference and noise ratio that arises from the noise power $|N(k)|^2$. This size can be calculated for example by using the Shannon capacity equation:

$$b(k) = \left\lceil W\log_2\left(1 + \frac{|H(k)|^2}{|N(k)|^2}\right)\right\rceil$$

where W is the subcarrier bandwidth and b (k) is the number of bits to carry in subcarrier k using a QAM constellation of size $2^{b(k)}$. This presupposes that the noise and interference term N(k) is also known. The use of the ceiling operator ⌋.⌈ reflects the desire to maximise the probability of correct decoding as a series of b(k) on the high side will result in the use of a lower rate FEC code for a given TBS. Also, the Shannon channel capacity equation relates to intrinsic information capacity anyway. Here, the bits that it is desired to carry are coded bits.

This means that the choice of constellation for each individual subcarrier in each OFDM symbol will depend on the signal to interference and noise power ratio (SINR) expected at that subcarrier at the receiver during the said OFDM symbol. Therefore, for subcarriers in which $|N(k)|^2$ is high and so the SINR could be low, D (k) would be taken from a low order constellation such as Quadrature Phase Shift Keying (QPSK) whilst for subcarriers in which $|N(k)|^2$ is low and so the SINR could be high, D (k) would be taken from a higher order constellation such as 64QAM or 256QAM.

Deciding for each subcarrier how many bits b (k) to carry therefore determines the constellation size to use for that subcarrier. Assume that the transmission resource size (number of resource elements (RE) allocated for transmission of the current TBS of L bits) is M—these could be on one or more OFDM symbols. Since b(k) is the number of bits to be carried in subcarrier or resource element k, the total number of bits that can be carried in the transmission resource of size M can be calculated and used to determine the optimum FEC code rate for this particular TB as:

$$r = L/\sum_{k=0}^{M-1} b(k)$$

From the above analysis, it is therefore possible that knowing the exact radio channel characteristics (the SINR) that a given transmission will traverse, the transmitter can format the signal it transmits so as to maximise the probability of decoding at the receiver. But, given a multi-carrier transmission system that adopts this paradigm, some questions are:

1. How would the receiver know which constellation was used for each subcarrier?
2. How would the transmitter know the radio channel characteristics that the next transmission block will traverse?
3. What happens if knowledge of the radio channel characteristics is not 100% accurate?

Normally, the lower layers, including the physical layer (PHY) of a mobile communications system are designed to ensure that the mobile communications system continues to work under some predetermined worst case propagation conditions. There are two significant problems with this approach. Firstly, it is difficult apriori to know all possible propagation conditions under which the system may need to operate. This means that for some propagation conditions typically dependent on location, the mobile communications system may not work effectively. Secondly, to enable operation in the worst conditions the system is designed to work under, the system is typically over-engineered for majority of normal operating conditions. Therefore, when propagation conditions are mild and better than the worst case conditions, the system operates inefficiently. Link adaptation has evolved as a means of changing system parameters to use a more efficient configuration of the system when conditions are better than the worst case and to change system parameters to use a less efficient configuration of the system as conditions approach the worst.

Figures 6, 7:
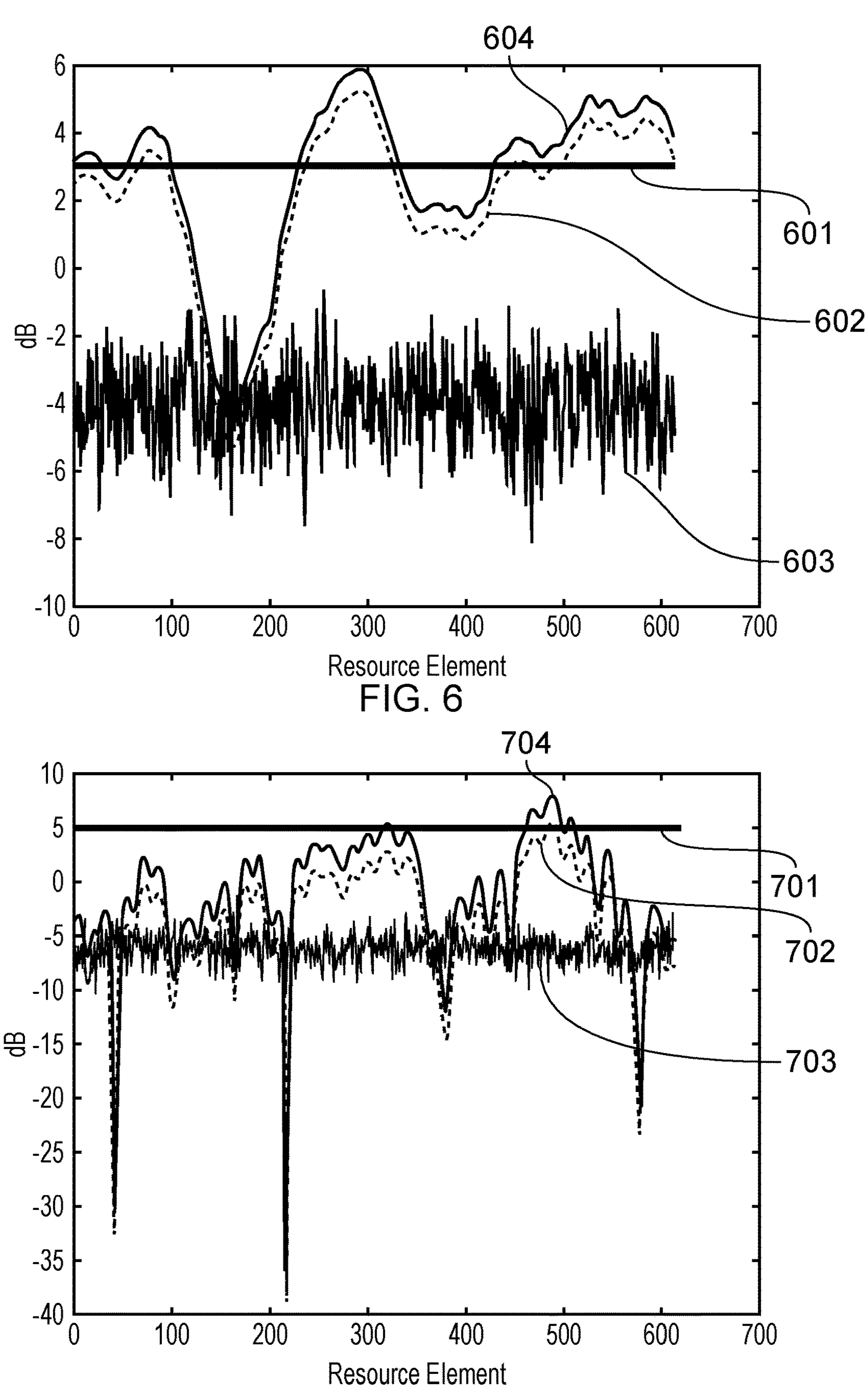
FIG. 6 illustrates a plot of signal to interference and noise power ratio (SINR), channel transfer function (CTF) and noise power per resource element (RE) for a clustered delay line (CDL) channel having a 3 dB signal-to-noise ratio (SNR)
FIG. 7 shows a plot of SINR, CTF and noise power per RE for a tapped delay line (TDL) channel having a 5 dB signal-to-noise ratio (SNR)

FIG. 6 shows on the same graph a sample plot of the channel transfer function (CTF), illustrated by line 602 indicative of the frequency selective fading suffered by each resource element (RE) of a clustered delay line channel (CDL-C) with a delay spread of 300 ns, the noise power per RE (meant to simulate noise and interference) illustrated by line 603, the SINR per RE illustrated with line 604, and with line 601 indicative of the additive white Gaussian noise SNR of 3 dB.

FIG. 7 shows a similar plot to that of FIG. 6 but for a tapped delay line channel (TDL-C) with a delay spread of 300 ns with line 701 indicative of the 5 dB SNR. Again, like FIG. 6, FIG. 7 shows the CTF 702, noise power per RE 703, and SINR per RE 704 for the TDL-C. These plots are based on a component channel bandwidth of 20 MHz using a subcarrier spacing of 30 kHz with a resource allocation 51 PRBs wide.

Use of Mixed Modulation in Wireless Communications

From FIGS. 6 and 7, it can be observed that the SINR per RE is not uniform across the resource allocation bandwidth because of frequency selectivity. Yet with such SINR/RE profiles, LTE and NR use the same modulation scheme per RE across the whole resource allocation. Since the SINR per RE may not be uniform across the resource allocation bandwidth, problems arise in selecting the optimum modulation scheme to use for the REs across the whole resource allocation.

It can therefore be expected that a scheme in which the size of the QAM constellation used for each RE depends on the SINR of the particular resource element will produce better link adaptation and hence higher throughput. Thus in REs where the SINR is very low (such as RE(215) that suffers a fade of more than 35 dB in FIG. 7 with SINR less than −35 dB), a lower QAM constellation such as BPSK is used whilst in REs such as RE(500) subjected to constructive superposition such that its SINR is more than 7 dB a larger QAM constellation such as 16QAM can be used.

The issues to solve when implementing such a scheme in which the size of the QAM constellation may vary across RE in a resource allocation are as follows:

- how the transmitter knows the SINR per RE;
- how it determines from the SINR the size of the QAM constellation to use for that RE; and
- how the receiver knows the choice that the transmitter has made for each RE.

Figure 8:
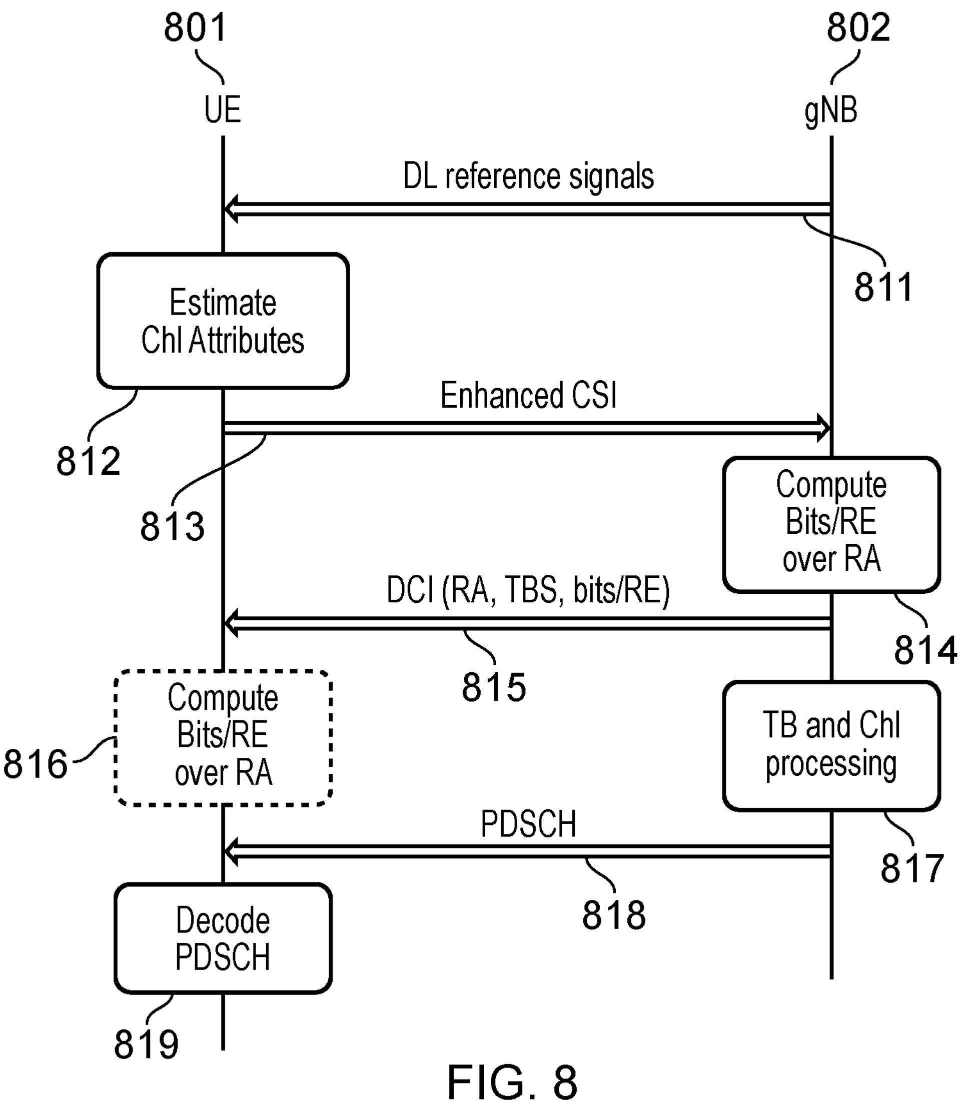
FIG. 8 shows a first example of a signalling exchange between a UE and a gNB for mixed modulation of a Physical Downlink Shared Channel (PDSCH) in accordance with embodiments of the present technique.

FIG. 8 is a signal flow diagram illustrating the signal exchanges between a gNB 802 and UE 801 that use mixed modulation in transmission of the PDSCH on the downlink, and in accordance with which UEs and/or gNBs may operate in accordance with embodiments of the present technique. The signal flow starts when the gNB 802 has a packet of data to transmit to the UE 801, and can be summarised as follows:

1. gNB 802 sends DL reference signals 811 such as CRS or CSI-RS to UE 801;
2. UE 801 uses the reference signals 811 to estimate the DL channel conditions 812 and transmits these back to the gNB 802 in some kind of enhanced CSI report 813. The enhanced CSI report 813 is such that the gNB 802 can use to compute the SINR across all resource units in the DL component carrier or BWP. Resource units can be resource elements, physical resource blocks (PRBs) or other combinations of these;
3. From the enhanced CSI report 813, the gNB 802 should be able to decide the resource allocation 814. The resource allocation (RA) is a particular set of resource units that on average exhibit a good SINR for carrying the packet in PDSCH. The gNB 802 also determines for each resource unit in the set which QAM constellation to use 814. Then the gNB 802 may include this information in the DCI 815 to the UE 801;
4. The DCI 815 includes a field that specifies the RA i.e. the set of resource units to be used for the transmission. The DCI 815 may also include amongst other fields a field which signals the modulation constellation size per allocated resource unit. If not, then the UE 801 knowing which resource units the gNB 802 has allocated will need to compute the modulation constellation size per allocated resource unit 816 itself. It can do this because it already has the last enhanced CSI information 813 which it sent to the gNB 802 (as described above in step 2);
5. The gNB 802 proceeds to encode the transmission packet or block and modulate it for transmission 817 in accordance with the modulation constellation per resource unit as it has previously computed (as described above in step 3) and which it might have transmitted to the UE 801 via DCI 815. After transport and channel processing 817, it is then transmitted on a PDSCH 818; and 6. The UE 801 knows the set of resource units that carry the TB and the modulation constellation used per resource unit which it has either calculated as detailed in step 4 or previously received via the DCI 815 and so can receive, demodulate and decode the TB 819.

Considering step 4 of the description of FIG. 8 above, whether or not the gNB 802 includes the modulation constellation size per allocated resource unit in the DCI 815 may depend on the signalled capability of the UE 801. For example, a UE which has enough processing capability to do the calculation may let the gNB know this via capability signalling. Then, a gNB so informed would not be required to include the modulation constellation size per allocated resource unit in the DCI as detailed in step 4, letting the UE compute it as also detailed in step 4. On the other hand, a UE without enough processing capability to do the calculation may let the gNB know this via capability signalling too. Then a gNB so informed will know that it is required to include the modulation constellation size per allocated resource unit to such a UE in the DCI.

In some arrangements of embodiments of the present disclosure, this determination on whether to let UEs calculate or transmit via DCI could be determined by system configuration and signalled either in system information or RRC signalling.

Figure 9:
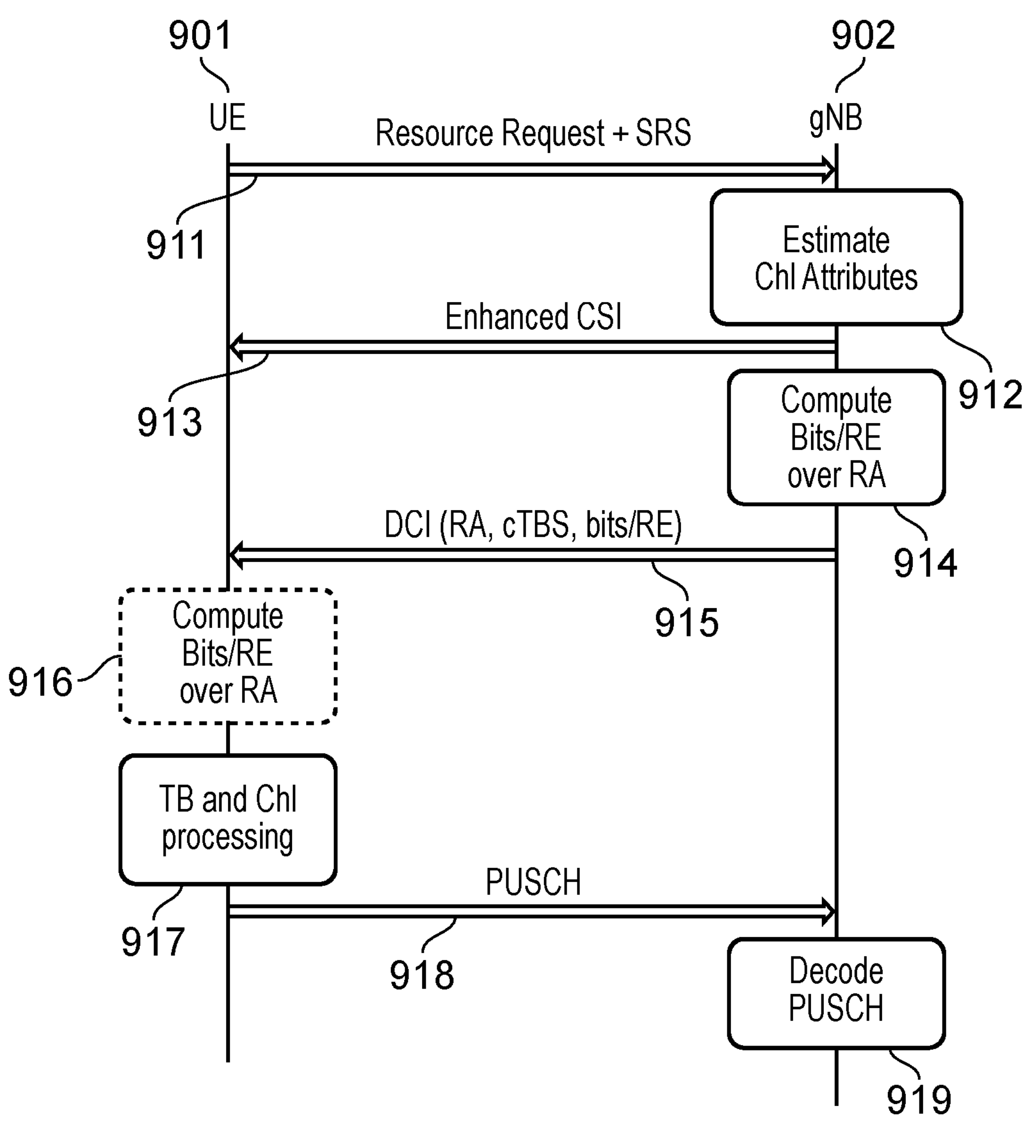
FIG. 9 shows a second example of a signalling exchange between a UE and a gNB for mixed modulation of a Physical Uplink Shared Channel (PUSCH) in accordance with embodiments of the present technique.

FIG. 9 is a signal flow diagram illustrating the signal exchanges between a gNB 902 and UE 901 that use mixed modulation in transmission of the PUSCH on the uplink, and in accordance with which UEs and/or gNBs may operate in accordance with embodiments of the present technique. The signal flow, in an opposite and corresponding manner to the signal flow illustrated by FIG. 8, starts when the UE 901 has a packet of data to transmit to the gNB 902, and can be summarised as follows:

1. The UE 901 sends a resource request 911 to the gNB 902 asking the gNB 902 to assign PUSCH resources for uplink transmission. The gNB 902 may in turn ask the UE 901 to send UL reference signals 911 such as SRS that it can use to estimate UL channel conditions 912;
2. gNB 902 uses the UL reference signals 911 to estimate the UL channel conditions 912 which it may transmit to the UE 901 in some kind of enhanced CSI report 913. The enhanced CSI report 913 is such that the UE 901 can use to compute the SINR across all resource units in the UL component carrier or BWP. Resource units can be resource elements, physical resource blocks (PRBs) or other combinations of these;
3. The gNB 902 uses the computed UL channel conditions 912 to decide the resource allocation 914. The resource allocation (RA) is a particular set of resource units that on average exhibit a good SINR for carrying the packet in PUSCH, The gNB 902 also uses the SINR to determine for each resource unit in the allocated set which QAM constellation to use 914. The gNB 902 may signal this information via DCI 915 to the UE 901;
4. The DCI 915 includes a field that specifies the RA i.e. the set of resource units to be used for the transmission. The DCI 915 may also include amongst other fields a field which signals the modulation constellation size per allocated resource unit. If not, then the UE 901 will need to compute the modulation constellation size per allocated resource unit 916. It can do this using the last enhanced CSI information 913 it received from the gNB 902 previously (as described above in step 2);
5. The UE 901 then proceeds to encode the transmission packet or block and modulate it for transmission 917 in accordance with the modulation constellation per resource unit that it has either previously computed (as described above in step 2) or previously received via the DCI 915 (as described above in step 3). After transport and channel processing 917, the TB is then transmitted on a PUSCH 918; and
6. The gNB 902 knows the set of resource units that carry the TB and the modulation constellation used per resource unit (as calculated in 914) and so can receive, demodulate and decode the TB 919.

Considering step 3 of the description of FIG. 9 above, whether or not the gNB 902 includes the modulation constellation size per allocated resource unit in the DCI 915 may depend on the signalled capability of the UE 901, in a similar manner to the method shown by the signal flow diagram of FIG. 8. For example, a UE which has enough processing capability to do the calculation may let the gNB know this via capability signalling. Then a gNB so informed would transmit the enhanced CSI to the UE in step 2 and not be required to include the modulation constellation size per allocated resource unit in the DCI as also detailed in step 3. On the other hand, a UE without enough processing capability to do the calculation may let the gNB know this via capability signalling too. Then a gNB so informed will know that it is not required to transmit the enhanced CSI of step 2 to such a UE but will include the modulation constellation size per allocated resource unit to such a UE in DCI.

In some arrangements of embodiments of the present disclosure, this determination on whether to let the UE calculate or transmit via DCI could be determined by system configuration and signalled either via system information or RRC signalling.

In co-pending European patent application number EP20166040.4 [3], techniques are disclosed for reducing the number of bits used in the DCI to signal the QAM constellations to be used for the set of resource units allocated for the transmission (with respect to step 3 of each of FIGS. 8 and 9 as described above). In [3], it is disclosed how suitably designed reference signals can be used to estimate the SINR per resource unit (RU) and how the SINR for each RU can be used to determine the modulation constellation suitable for that RU. Using this SINR per RU, the receiver can then apply Shannon's channel capacity theorem to calculate the number of bits that can be carried by this RU as follows:

$$b(l,k) = Q(\Delta f T_s \log_2(1 + SINR(l,k)))$$

where Δf is the subcarrier spacing in Hz, $T_s = T_u + T_g$ (<<1 s) is the OFDM symbol duration in seconds inclusive of any cyclic prefix; b(l, k) is the number of bits to be carried in RU k of OFDM symbol l using a QAM constellation of size $2^{b(l,k)}$ and SINR(l, k) is the signal power to interference and noise power ratio at RE k of OFDM symbol l. The function Q(.) is a quantizer that ensures that only square QAM constellations in which $b(l,k) \in \{1, 2, 4, 6, 8\}$ are considered. In [3] it is also explained how b(l, k) is calculated when the RU is made up of multiple REs such as for the case in which a RU is a PRB.

The transmission of the enhanced CSI is effectively akin to transmitting the SINR for each RU in the RU set used in the resource allocation. However, transmitting the SINR for all RUs in the resource set will require a rather large number of bits for the CSI. In order to alleviate such an issue, embodiments of the present technique propose techniques for reducing the number of bits used for signalling the enhanced CSI information (with respect to step 2 of each of FIGS. 8 and 9 as described above).

Enhanced CSI for Signalling the Use of Mixed Modulation in Wireless Communications Embodiments of the present disclosure propose the transmission of a concise representation of the SINR sequence that allows the receiver to estimate the full SINR sequence.

As is illustrated in FIGS. 6 and 7, the SINR is largely determined by the effects of channel selectivity arising from multipath propagation. Further, it can be reasonably assumed both from the short cyclic prefix used in the physical layer and also the granularity of resource units (PRB) used in resource allocation that the delay spread of the channel is relatively short.

The SINR plots in FIGS. 6 and 7 have fine features arising from low level echoes in the channel but also noise and interference. The process used to determine the QAM constellation per RU is not sensitive enough to be significantly impacted by such fine details since the allowed QAM constellations do not form a smooth continuum—only BPSK and square QAM constellations. For example, considering the current specifications for LTE and NR, $b(l, k)\varepsilon\{1, 2, 4, 6, 8\}$.

Figure 10:
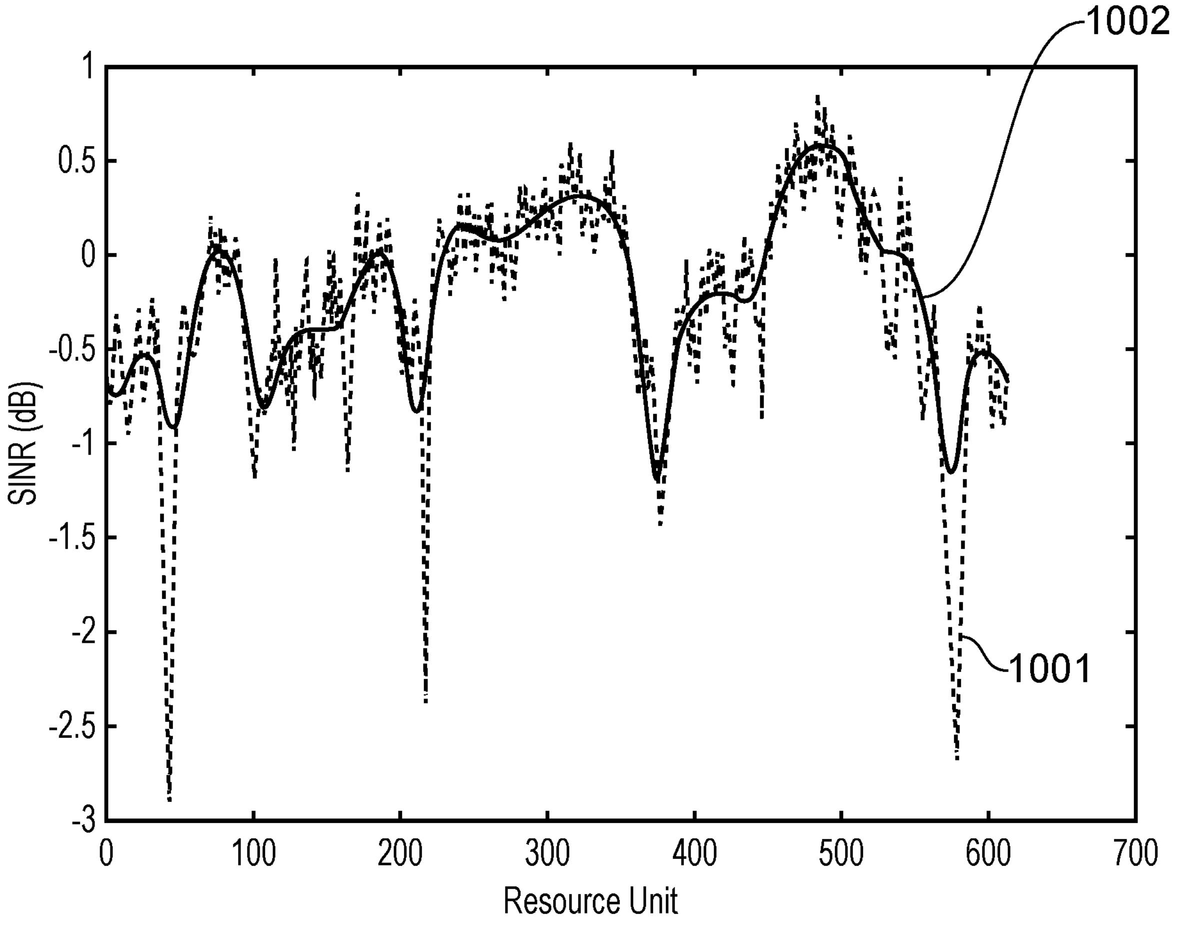
FIG. 10 illustrates an example of the smoothing of an SINR sequence as a result of concise representation in accordance with embodiments of the present technique.

This means that the SINR sequence to be used for calculating b(l, k) can be a smoothed version of those illustrated in FIGS. 6 and 7 without significant degradation in the results. Smoothing can be achieved by passing the SINR sequence through a low-pass filter with a cut-off frequency set to an inverse of the expected delay spread of the channel. FIG. 10 shows an example of this, with an SINR sequence represented by line 1001 filtered to produce a smoothed SINR signal represented by line 1002. The use of low pass filters brings complexity because the filter characteristics depend on the estimate of the current delay spread of the channel and the numerology. This means a large number of possible filters would be implemented and the particular filter to use selected depending on the numerology and delay spread. Then after filtering, despite the complexity involved, a representation of the filtered SINR sequence that is concise enough for low bit rate transmission in an enhanced CSI report is still needed.

Embodiments of the present disclosure relate to methods which can:

- provide a concise description of the SINR sequence amenable to low complexity smoothing such as is illustrated in FIG. 10; and
- allow an efficient and robust encoding scheme to allow transmission of the SINR concise description in an enhanced CSI report.

As described above, the SINR is highly influenced by the channel transfer function (CTF). In the methods described in [3], the CTF used for calculating the SINR is derived from an averaging of the CTF per RU at all the OFDM symbols covered by the resource allocation. One concise way of presenting the CTF is through the channel impulse response which can be derived from a deconvolution of the CTF.

A cepstrum [4] (derived from and understandable as an analogy to "spectrum") can be used to determine from a subject signal the arrival times of the fundamental wavelet which the signal comprises and its echoes and their relative amplitudes. If the fundamental wavelet is an impulse $\delta(t=0)$, then the result of such an analysis is essentially the impulse response of the system that produced the signal. A cepstrum of a sequence x(nT) is defined as the inverse Z-transform of the Z-transform of the sequence. Frequently, but not necessarily, the Z-transform is processed with a whitening process:

$$\hat{x}(nT) = \frac{1}{j2\pi}\oint_c F(X(z))z^{n-1}dz$$

Where

F(.) is a non-linear whitening function

X(z) is the Z-transform of the sequence x(nT)

Imagine that x(nT) is the convolution of two sequences—g(nT) and h(nT) as:

$$x(nT) = g(nT) * h(nT)$$

Z-transforming:

$$X(z) = G(z).H(z)$$

Assuming the non-linear function F(.) is log (|X(z)|) then:

$$\log(X(z)) = \log(G(z)) + \log(H(z))$$

Inverse Z-transforming:

$$\hat{x}(nT) = \hat{g}(nT) + \hat{h}(nT)$$

Where the hat on each of the signals corresponds to the cepstrum of the particular signal. The cepstra $\hat{g}(nT)$ and $\hat{h}(nT)$ can be separated by so-called liftering (derived from and understandable as an analogy to "filtering") if they occur in different regions of $\hat{x}(nT)$. Liftering is equivalent to filtering but in the cepstral domain. Further, if the non-linear function F(.) is invertible, one can go back and forth between the time, frequency and cepstral domains.

In this instance, let g(nT) be the delta pulse defined as follows:

$$g(nT) = \begin{cases} 1 & \text{for } n = 0 \\ 0 & \text{for } n \neq 0 \end{cases}$$

and the function h(nT) represent the impulse response of the channel. Then G(z)=1 and $\hat{g}(nT)=0$. Therefore:

$$\hat{x}(nT) = \hat{h}(nT)$$

Figure 11:
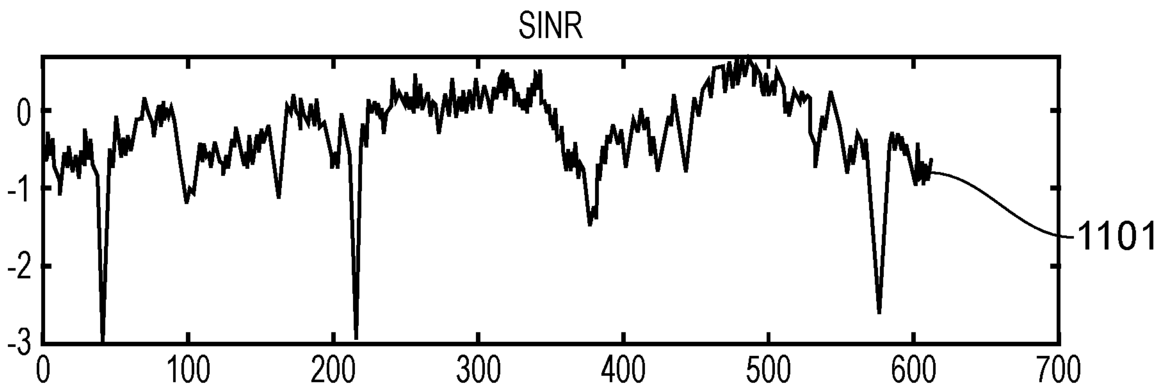
FIG. 11 illustrates an example of a cepstrum-derived SINR in accordance with embodiments of the present technique.
Figure 11:
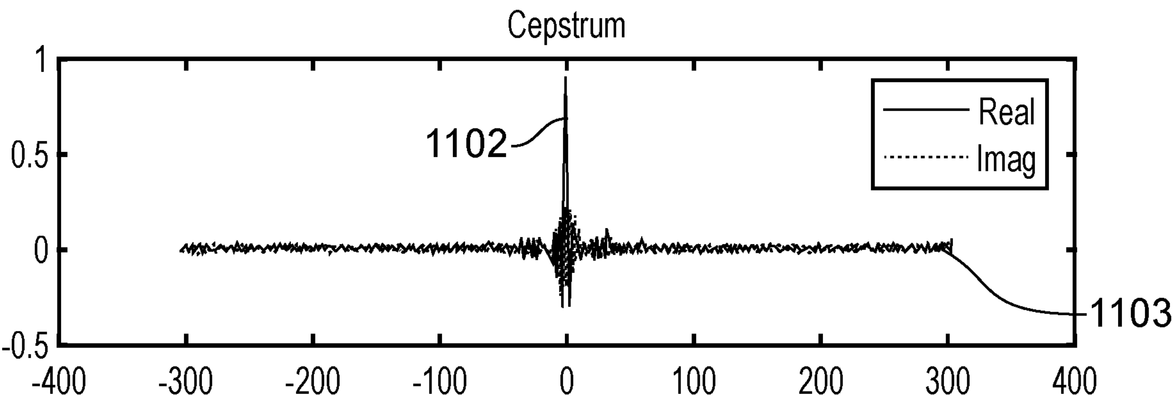
Figure 11:
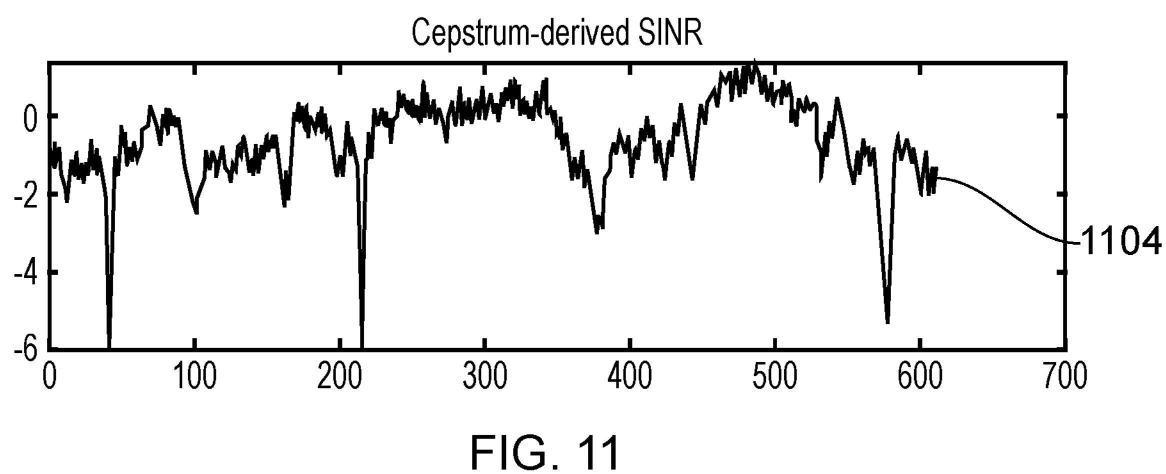

There is therefore no need to separate the wavelet from its echoes as the computed cepstrum is the channel impulse response. Indeed, basic Fourier and inverse Fourier transforms can simply be used to generate the cepstrum since there is no separation issue in the transform domain. This is illustrated in FIG. 11, in which the top plot 1101 is the SINR, which is considered the Fourier transform X(z) in the analysis above. The plot in the middle of FIG. 11 is the cepstrum (with both real 1102 and imaginary 1103 parts illustrated) derived from an inverse transform of X(z). The ringing noticeable in the cepstrum is characteristic of the impulse response of a transversal system which is what the simulated channel model is. The forward transform of the cepstrum (i.e. the reconstructed SINR) is plotted in the bottom plot 1104 of FIG. 11 and it can be seen that it is a near exact copy of the original SINR plot 1101.

Figure 12:
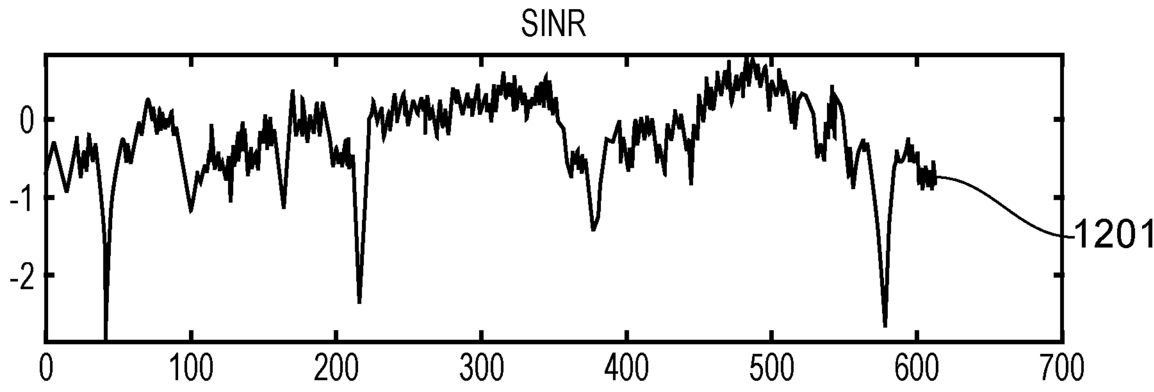
FIG. 12 illustrates an example of a liftered cepstrum-device SINR in accordance with embodiments of the present technique.
Figure 12:
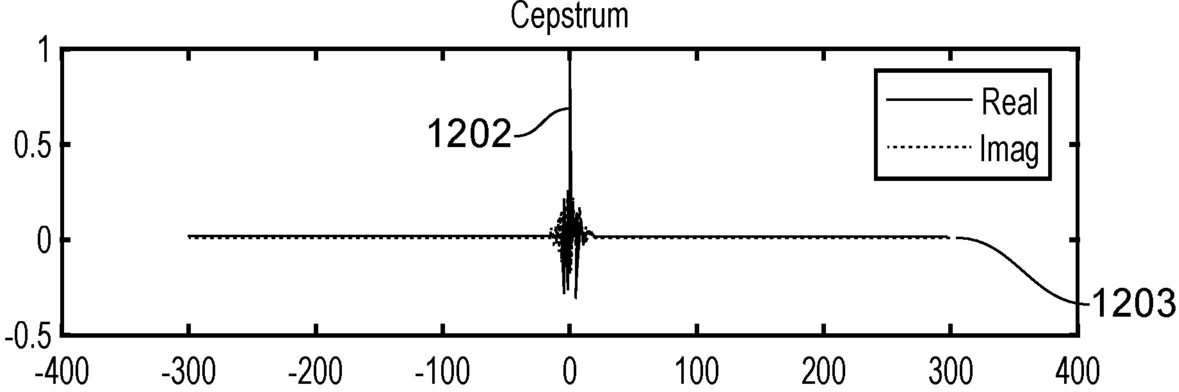
Figure 12:
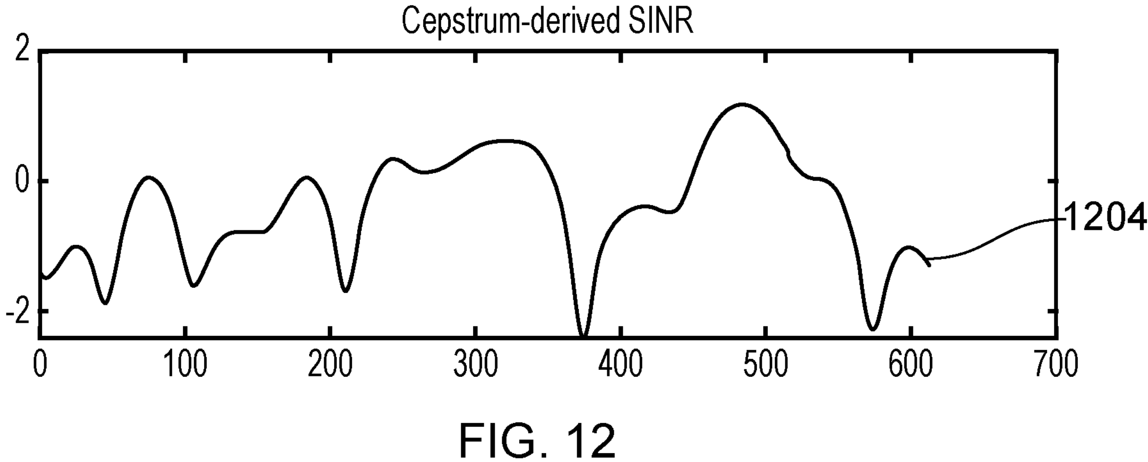

In the plot of the cepstrum in FIG. 11, the x-axis is the so called quefrency (from "frequency") which is equivalent to time. The impulse response of a multipath channel of short delay spread is a cluster of pulses of varying amplitudes and phases concentrated within a short duration of time. In the plot of the cepstrum in FIG. 11, low amplitude impulses are still visible long after the main impulse. Most of these long delay impulses are due to channel noise and interference since the channel delay spread is known to be short. These impulses at long delays are responsible for the fine structure of the SINR plot in FIGS. 10 and 11. As discussed previously, this fine structure is not really needed in determining the QAM constellation per RU because of the coarse granularity of available constellation sizes. The cepstrum-derived SINR sequence can be smoothed by using liftering. Liftering in this case is equivalent to applying a rectangular window of width 2 W+1 centred over the sample of highest energy to the cepstrum. This is illustrated in FIG. 12, which is similar to FIG. 11 with SINR plot 1201 and cepstrum plotted with real 1202 and imaginary 1203 parts, except that the cepstrum-derived SINR plot 1204 is calculated from the cepstrum plotted in the middle, where this cepstrum has been liftered. Furthermore, the liftered cepstrum is clearly more concise for transmission purposes as it contains fewer non-zero samples, although it results in a slightly less accurate and precise reconstruction of the SINR sequence. However, this reconstructed SINR is still good enough for the purpose of determining the bits per RU and the modulation scheme per RU.

Figure 13:
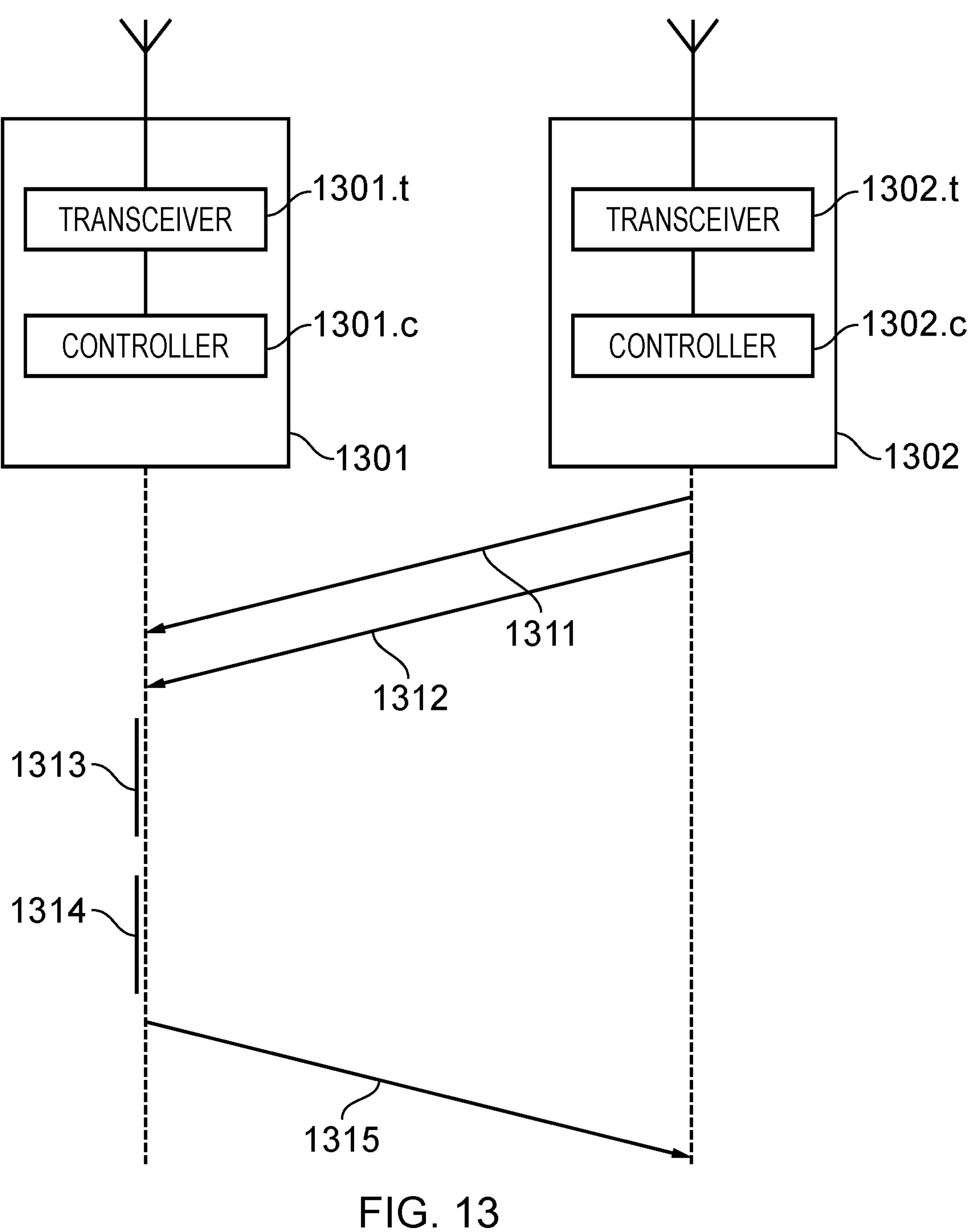
FIG. 13 is a part-schematic, part-message flow diagram representation of a wireless communications system comprising a transmitting entity and a receiving entity in accordance with embodiments of the present technique.

FIG. 13 is a part-schematic, part-message flow diagram representation of a wireless communications system comprising a receiving entity 1301 and a transmitting entity 1302 in accordance with embodiments of the present technique. In the example of FIG. 13, the receiving entity 1301 is an infrastructure equipment and the transmitting entity 1302 is a communications device, though the skilled person would be aware that embodiments of the present technique may equally apply to scenarios where an infrastructure equipment is a transmitting entity and a communications device is a receiving entity, and/or could be described with respect to operation of a communications device rather than infrastructure equipment. The infrastructure equipment 1301 is configured to receive data from the communications device 1302 via a communications channel between the infrastructure equipment 1301 and the communications device 1302. The infrastructure equipment 1301 comprises a transceiver (or transceiver circuitry) 1301.*t* to transmit signals to and to receive signals from the communications device 1302, and a controller (or controller circuitry) 1301.*c* to control the transceiver 1301.*t* to transmit and to receive the signals. Correspondingly, the communications device 1302 comprises a transceiver (or transceiver circuitry) 1302.*t* to transmit signals to and to receive signals from the infrastructure equipment 1301, and a controller (or controller circuitry) 1302.*c* to control the transceiver 1302.*t* to transmit and to receive the signals. Each of the controllers 1301.*c*, 1302.*c* may be, for example, a microprocessor, a CPU, or a dedicated chipset, etc. Each of the transceivers 1301.*t*, 1302.*t* may be an integrated unit comprising elements which are configured to either transmit or to receive signals via one or more antennas, or may instead be formed of separate transmitters and receivers configured to transmit/receive signals via the antennas.

The controller circuitry 1301.*c* of the infrastructure equipment 1301 is configured in combination with the transceiver circuitry 1301.*t* of the infrastructure equipment 1301 to receive 1311, from the communications device 1302, a request for a resource allocation within which the communications device 1302 is to transmit data to the infrastructure equipment 1301, to receive 1312 one or more reference symbols from the communications device 1302, to estimate 1313 based on the received reference symbols 1312, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, to perform 1314 a first transform followed by a second transform on the SINR sequence to produce a cepstrum of the SINR sequence, the second transform being an inverse of the first transform, and to encode and to transmit 1315 the cepstrum to the communications device 1302.

As described above, an RU comprises both time resources and frequency resources. As referred to herein, the term RU is used as a generalisation for a number Y of REs over a number X of OFDM symbols, where Y€{1, 12k} and X€{t, 6n, 7n} and where k, t and n are integers such that k>0, t>0 and n>0. Therefore, the following cases exist when referring to an RU:

- An RU is only 1 RE explicitly;
- An RU is a NR PRB (as those skilled in the art would appreciate, in NR, a PRB is made up of 12 REs in one OFDM symbol);
- An RU is LTE PRB (as those skilled in the art would appreciate, in LTE a PRB is made up of 12 REs over 6 or 7 OFDM symbols depending on whether the cyclic prefix is extended or not, respectively); or
- An RU is multiple of any of the above A resource allocation (RA) can allocate multiples of each type of RU (as defined above) and different RAs can have different granularities of RUs. It should be noted that in the case of an RA of multiples in each case (as described above), the RA can span both time (i.e. more than 1 OFDM symbol in NR and more than 6 or 7 OFDM symbols in LTE) and frequency (i.e. N×7 REs, in both NR and LTE).

Essentially, embodiments of the present technique propose that the SINR estimated using reference signals as described in co-pending European patent application number EP19209541.2 [5] is transformed into a cepstrum [4] for transmission. This cepstrum may be liftered to smoothen it and reduce the number of impulses it carries. This liftered cepstrum of the SINR may be quantized and encoded as an enhanced CSI measurement to be computed in accordance with the previous section and then transmitted by the UE to the gNB for PDSCH scheduling or by the gNB to the UE for PUSCH scheduling. At each end of the transmission link, this liftered cepstrum after decoding may then be inverse cepstrally transformed to provide an estimate of the SINR for the set of RUs in the resource allocation. This estimate of the SINR will then be used to estimate the QAM constellation size for each RU as described above, using the equation reproduced below:

$$b(l,k) = Q(\Delta f T_s \log_2(1 + SINR(l,k)))$$

In some arrangements of embodiments of the present technique, as described above, the cepstrum is liftered to reduce the number of samples to encode for transmission. In other words, the receiving entity (i.e., with reference to FIG. 13, the infrastructure equipment 1301) is configured to perform a liftering process on the cepstrum before transmitting the encoded cepstrum to the communications device, the liftering process comprising applying a rectangular window on the cepstrum to reduce a number of a plurality of samples of the cepstrum. Upon receipt of a liftered cepstrum, the transmitting entity (i.e., with reference to FIG. 13, the communications device 1302) will then need to reinsert the samples removed through the liftering process and set these to zero, prior to carrying out the inverse cepstral transform to recover the SINR sequence.

Liftering may be done by applying a rectangular window of 2W+1 samples centred on the location of the maximum energy impulse identified in the cepstrum. In other words, the rectangular window is centred on a sample of the cepstrum having a highest energy impulse from among the plurality of samples of the cepstrum. In such arrangements, the 2W+1 samples under the window may then be quantized and efficiently encoded for transmission.

Liftering may also be done by applying a rectangular window of W+1 samples but with the left edge of the window coincident with the location of the maximum energy impulse identified in the cepstrum. In other words, the rectangular window starts at the location of a sample of the cepstrum having a highest energy impulse from among the plurality of samples of the cepstrum. In further arrangements, after applying the window, the samples to the left side of the window are reproduced (by the transmitting entity (i.e., with reference to FIG. 13, the communications device 1302) by reflection in the plane formed by the left edge of the window. In other words, the liftering process by the communications device 1302 comprises, mirroring the rectangular window in accordance with a plane of reflection at the sample of the cepstrum with the highest energy impulse from among the plurality of samples of the cepstrum. In common with the previously described arrangements, only W+1 samples may then need to be quantized and efficiently encoded for transmission.

The width of the lifter: the number of bits used for transmitting the cepstrum depends on W. If the liftering width W is too small, the liftered cepstrum will deviate significantly from the unliftered cepstrum, degrading the accuracy of SINR estimation and thereby, cause errors in the determination of the QAM constellation per RU. The value of W can be configurable by the receiving entity (i.e., with reference to FIG. 13, the infrastructure equipment 1301) but it should generally give a liftering width of duration similar to the expected channel delay spread. The value of W can also be fixed—a reasonable fixed value to adopt is the number of samples in the cyclic prefix because this reflects the expected maximum length of any channel delay spread. As actual channels often have delay spreads shorter than the CP duration, the liftering width can alternatively be fixed to a reasonable proportion of the CP length such as 75%.

In some arrangements of embodiments of the present technique, the liftered cepstrum (or indeed, non-liftered cepstrum) may then be encoded for transmission in a manner that minimises the number of bits required for its transmission. In other words, the receiving entity (i.e., with reference to FIG. 13, the infrastructure equipment 1301) is configured to encode the cepstrum by performing an encoding process on the cepstrum before transmitting the encoded cepstrum to the communications device. Various such arrangements discussed below cover some possible encoding schemes.

A first such scheme may be direct quantisation. Here, each complex sample of the subsisting impulses after liftering is quantized with m bits per quadrature component. This means that for a W+1 length liftering window, the number of bits required to transmit the CSI will be 2m(W+1). In choosing a value for m it is important to be mindful of the quantizer SNR $Q_m$=6m dB of the channel impulse response, as this influences the range of impulse amplitudes that can still be distinguished post-quantization. For example, if m=3 the dynamic range of the quantizer for each quadrature sample shall be $Q_3$=18 dB and with W=4 and (W+1)=5 samples to be quantized and encoded, 2m(W+1)=2*3*(4+1)=30 bits for the one-sided liftered cepstrum.

In some arrangements, the quantizer can be differential. Here, the highest amplitude sample is quantized fully with m bits per quadrature value. If this sample is designated as $x_0$ quantized to $\hat{x}_0$ then to quantize the next non-zero sample, $x_1$, the difference $d_1=\hat{x}_0-x_1$ is then quantized instead as $\hat{d}_1$. The same is then done for the rest of the non-zero samples. As $d_s$ has a lower dynamic range than $x_s$ the number of bits for quantizing each $\hat{d}_s$ will also be lower than m bits per quadrature value. At the transmitting entity (i.e., with reference to FIG. 13, the communications device 1302), after first receiving $\hat{x}_0$, the rest of the samples are decoded as follows:

$$\hat{x}_s = \hat{x}_{s-1} + \hat{d}_s$$

for s=1 to W. For example, if m=3 and each difference is coded with 2 bits, the total number of bits for a W=4 sample window will be 2×3+2×4×2=22 bits.

In other arrangements, samples $x_s$ are converted to polar form as:

$$\check{x}_s = |x_s| e^{-i\emptyset_s}$$

where $\emptyset_s$ is the argument. As the amplitude $|x_s|$ is unsigned, it can be quantized more accurately with the same number of bits m as $x_s$. Further, the phase can be quantized more coarsely e.g. using m−1 bits only. For example, if m=3 and each phase is coded with 2 bits, the total number of bits for a W=4 sample window will be 3×5+2×5=25 bits. In other words, the encoding process comprises converting the cepstrum to polar form and performing a quantisation operation on the converted cepstrum. This quantisation operation may actually be separate quantisation operations performed on the amplitude and phase of the converted cepstrum.

In other arrangements, the cepstrum may be augmented with a bit-map indicating non-zero amplitudes. Not all the samples within the (W+1) window will have non-zero energy. To avoid transmitting m bits for samples with zero energy, a bit map made up of (W+1) bits $\{b_{(W)}, b_{(W-1)}, \ldots, b_0\}$ may be used, and $b_i$=1 may be set when sample i in the window is non-zero, otherwise, $b_i$=0. The non-zero samples are then quantized using any of the above (or below) described quantization schemes, whilst the zero-valued samples are not. In other words, the encoding process comprises determining which of a plurality of samples of the cepstrum have an energy impulse substantially equal to zero, and performing a quantisation operation on only samples of the cepstrum having a non-zero energy impulse.

In some arrangements, the quantization may be vector quantization. For such vector quantization, there is a trained codebook of C possible channel impulse responses. The codebook may be created offline during the design phase by capturing N×C (where the large number N>100 for example) channel impulse responses of length (W+1) samples in a database. Each of the responses may be normalized to have unit energy. By using, for example a clustering training algorithm [6], the vectors can be reduced to $C=2^L$ separate centroid vectors. During operation, the energy G of the (W+1) samples of the liftered impulse response may be calculated as:

$$G = \sum_{s=0}^{W} |x_s|^2$$

G is used to normalise the derived impulse response $x_s$ to unit energy. The best shape match for the normalized impulse response in the codebook may then be found by finding the codebook entry which provides the minimum mean squared error between itself and the normalized liftered impulse response:

$$I = \min_{l} \frac{1}{(W+1)} \sum_{s=0}^{W} \left| (x_s - c_s^l)^2 \right|$$

The codebook index or address of this best match vector in the codebook may then be transmitted using $L=\log_2 C$ bits and the normalisation factor G is quantized, coded and transmitted too.

At the transmitting entity (i.e., with reference to FIG. 13, the communications device 1302), on receiving I and G, the transmitting entity uses I to read off the vector $c_s^I$ from a copy of the codebook which is also present at the transmitting entity, and then generates a replica of the transmitted impulse response as:

$$\hat{x}_s = G c_s^L$$

For example, if G is quantized and coded with 4 bits and the codebook holds 1024 vectors each of (W+1) samples long, then the full liftered impulse response can be transmitted with 4+10=14 bits.

Embodiments of the present technique enable an OFDM-based radio access communications system design which copes with varying challenging radio propagation conditions by changing the modulation from one OFDM resource unit (RU) to the other.

Following receipt of the cepstrum, the transmitting entity (i.e., with reference to FIG. 13, the communications device 1302) may then be able to use it to reconstruct the SINR. The infrastructure equipment may then (or may have previously, if it is the receiving entity and itself transmitted the cepstrum) determine a resource allocation of the communications channel, based on the SINR or the reconstructed SINR sequence, for the communications device to transmit the data to the infrastructure equipment, and to transmit the indication of the resource allocation to the communications device.

Those skilled in the art would appreciate that the selection of RUs for the purposes of resource allocation is always performed by the infrastructure equipment, regardless of whether it is the transmitting entity or the receiving entity, and transmitted by the infrastructure equipment to the communications device. However, either of the infrastructure equipment or communications device may perform the measurements and subsequent processing on the SINR, and it is typically the receiving entity, on received reference signals from the transmitting entity. Thus, if these measurements are carried out at the UE (pertaining to planned DL transmissions), then the UE has to transmit the SINR (as a cepstrum) to the gNB, which will make the decisions about which RUs will be used for the PDSCH and which QAM modulation will be used for each RU. Conversely, if the measurements are made at the gNB (pertaining to planned UL transmissions), then the gNB after deciding which RUs the UE should use for transmission of the PUSCH also has to transmit the SINR (as a cepstrum) for the allocated RUs—along with or separately to the resource allocation itself—to the UE so that the UE can use to determine which QAM modulation will be used for each RU. Such transmission of the SINR in this enhanced fashion, with use of a cepstrum, is something which has not been addressed by known techniques.

On receiving the resource allocation, and having knowledge of the SINR of each of the allocated RU, the transmitting entity (i.e., with reference to FIG. 13, the communications device 1302) may then be able to determine what kind of modulation should be used for each RU, with varying degrees of granularity. As described above, here, and throughout the present disclosure, a RU may refer to a single resource element (RE), a number of REs forming a physical resource block (PRB) (which may for example be either an LTE PRB or an NR LTE), or a group of contiguous PRBs. Thus, the communications device to determine, based on the received indication of the resource allocation in combination with the received cepstrum, which of a plurality of modulation schemes is to be used by the communications device (or, if the infrastructure equipment is the transmitting entity, which of the plurality of modulation schemes will be used by the infrastructure equipment) for each of the RUs of the resource allocation.

Here, multiple different modulation schemes may be chosen by the transmitting entity for the same resource allocation, selecting a most optimum of a set of different modulation schemes dependent on the channel conditions (determined based on the SINR derived from the received cepstrum) for each part of the resource allocation, where the granularity may be variable (and determined by either of the receiving or transmitting entities) as described above. Such a set of modulation schemes may comprise only BPSK and square QAM constellations in which $b(l, k)\varepsilon\{1, 2, 4, 6, 8\}$ (i.e. BPSK, QPSK, 16QAM, 64QAM, 256QAM respectively), or may comprise only non-square QAM constellations such as with $m\in\{3, 5, 7, 9\}$ corresponding to 8-PSK, 32-APSK, 128-APSK, 512-APSK, respectively, or may comprise a mixture of square and non-square QAM constellations. In other embodiments other non-QAM and/or non-uniform constellations may also be used.

The transmitting entity (i.e., with reference to FIG. 13, the communications device 1302) may then be configured to transmit the data to the receiving entity (i.e., with reference to FIG. 13, the infrastructure equipment 1301) within the resource allocation in accordance with the determined modulation schemes.

FIGS. 14 to 17 are flow diagrams providing example operation of infrastructure equipment and communications devices in accordance with at least some embodiments of the present technique, demonstrating how operation varies depending on which of a communications device and an infrastructure equipment the transmitting entity and the receiving entity are. With reference to steps such as transmitting/receiving reference symbols, estimating channel conditions, producing a cepstrum from an SINR sequence and the like, the skilled person would understand how such steps are carried out, both in terms of the usage of such terminology in the art, and with reference to the arrangements of embodiments of the present technique as described herein.

Figure 14:
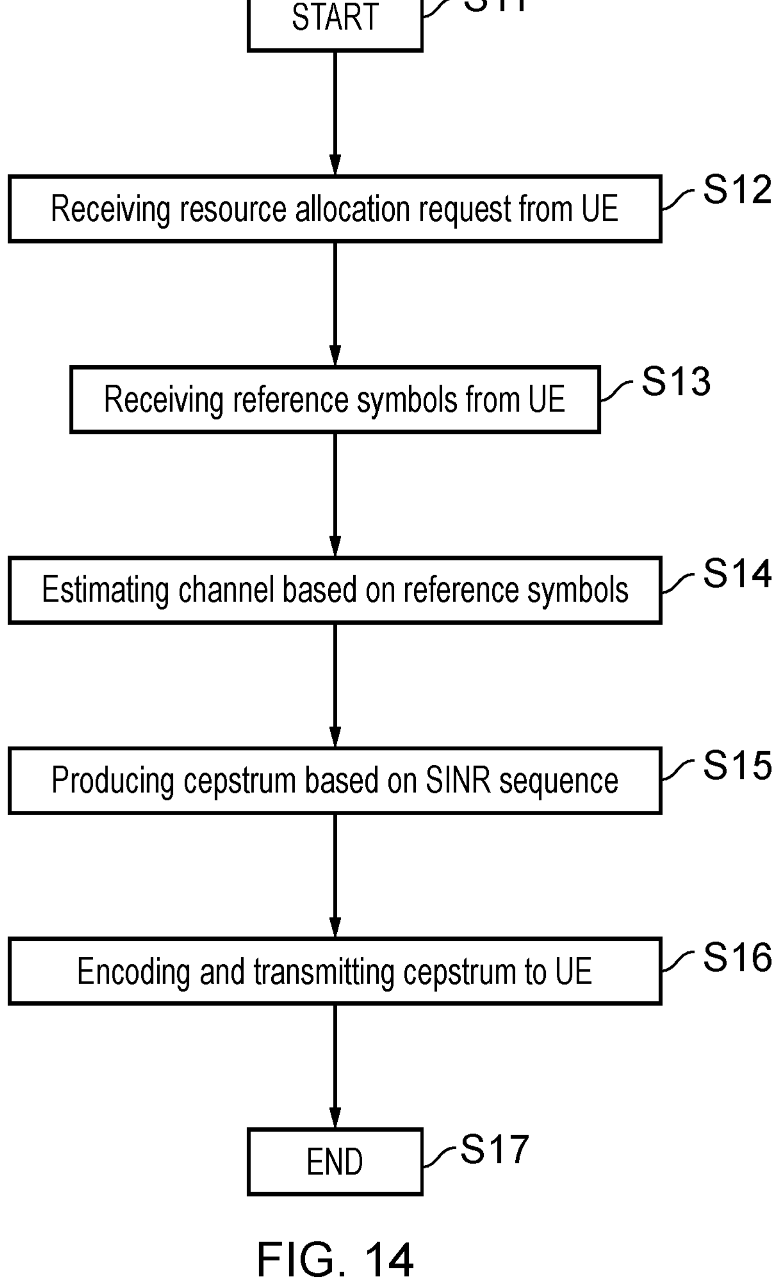
FIG. 14 shows a flow diagram illustrating a first example process of communications in a communications system in which an infrastructure equipment receives data from a communications device in accordance with embodiments of the present technique.

FIG. 14 shows a flow diagram illustrating a first example process of communications in a communications system in which an infrastructure equipment (e.g. a gNB) determines that it will receive data from a communications device (e.g. a UE) in accordance with embodiments of the present technique. FIG. 14 is a method of operating the gNB.

The method starts in step S11. In step S12, the method comprises receiving, from the communications device, a request for a resource allocation within which the communications device is to transmit data to the infrastructure equipment, and in step S13, receiving one or more reference symbols from the communications device. In step S14, the process comprises estimating based on the received reference symbols, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel. In step S15, the process comprises performing a first transform followed by a second transform on the SINR sequence to produce a cepstrum of the SINR sequence, the second transform being an inverse of the first transform. Finally, the method involves encoding and transmitting of the cepstrum to the communications device in step S16, before the method ends in step S17.

Figure 15:
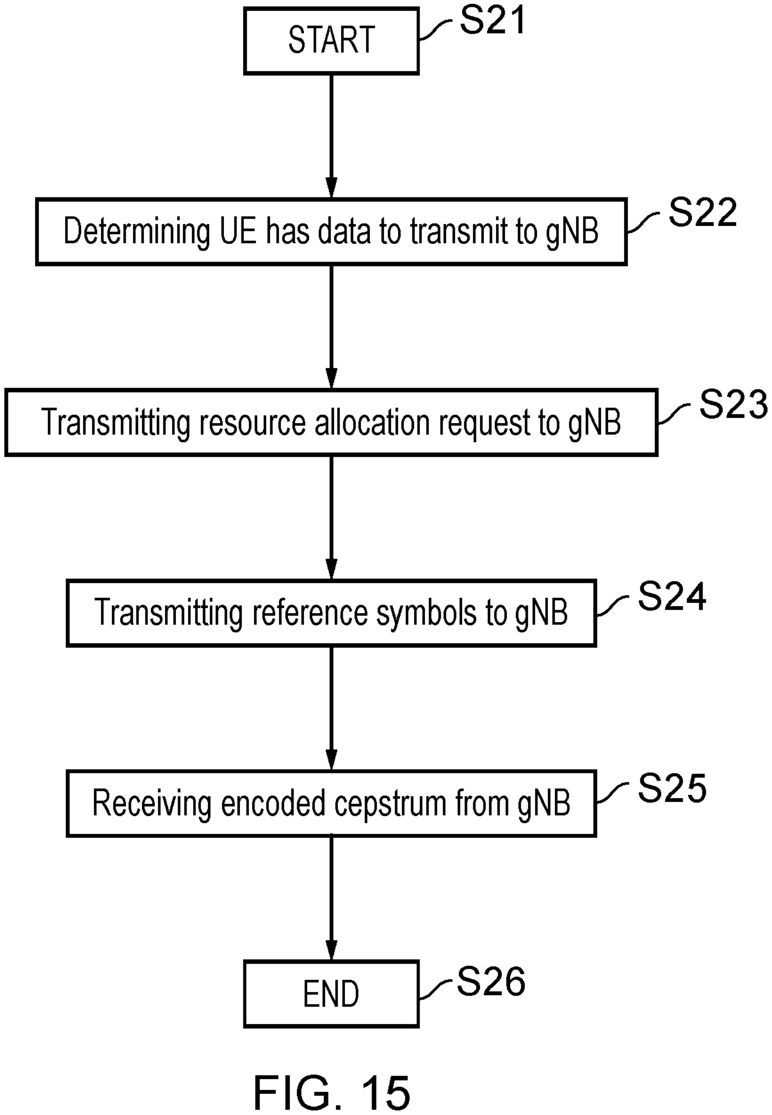
FIG. 15 shows a flow diagram illustrating a second example process of communications in a communications system in which a communications device transmits data to an infrastructure equipment in accordance with embodiments of the present technique.

FIG. 15 shows a flow diagram illustrating a second example process of communications in a communications system in which a communications device has data to transmit to an infrastructure equipment in accordance with embodiments of the present technique. FIG. 15 is a method of operating the UE.

The method starts in step S21. In step S22, the method comprises determining that the communications device has data to transmit to the infrastructure equipment. The method then comprises, in step S23, transmitting, to the infrastructure equipment, a request for a resource allocation within which the communications device is to transmit the data to the infrastructure equipment. In step S24, the process comprises transmitting one or more reference symbols to the infrastructure equipment, the reference symbols being for use by the infrastructure equipment in estimating, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel. The method then comprises, in step S25, receiving, from the infrastructure equipment, an encoded cepstrum of the SINR sequence, the cepstrum having been produced by the infrastructure equipment by performing a first transform followed by a second transform on the SINR sequence, the second transform being an inverse of the first transform, before ending in step S26.

Figure 16:
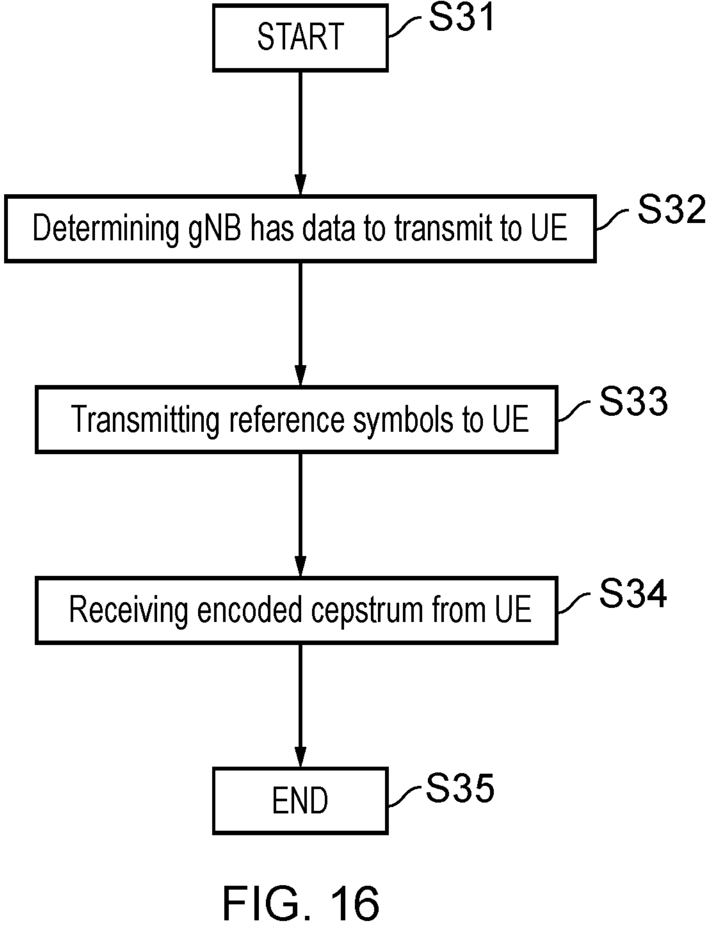
FIG. 16 shows a flow diagram illustrating a third example process of communications in a communications system in which an infrastructure equipment transmits data to a communications device in accordance with embodiments of the present technique.

FIG. 16 shows a flow diagram illustrating a third example process of communications in a communications system in which an infrastructure equipment has data to transmit to a communications device in accordance with embodiments of the present technique. FIG. 16 is a method of operating the gNB.

The method starts in step S31. In step S32, the method comprises determining that the infrastructure equipment has data to transmit to the communications device. The process then comprises, in step S33, transmitting one or more reference symbols to the communications device, the reference symbols being for use by the communications device in estimating, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel. In step S34, the method involves receiving, from the communications device, an encoded cepstrum of the SINR sequence, the cepstrum having been produced by the communications device by performing a first transform followed by a second transform on the SINR sequence, the second transform being an inverse of the first transform. The process ends in step S35.

Figure 17:
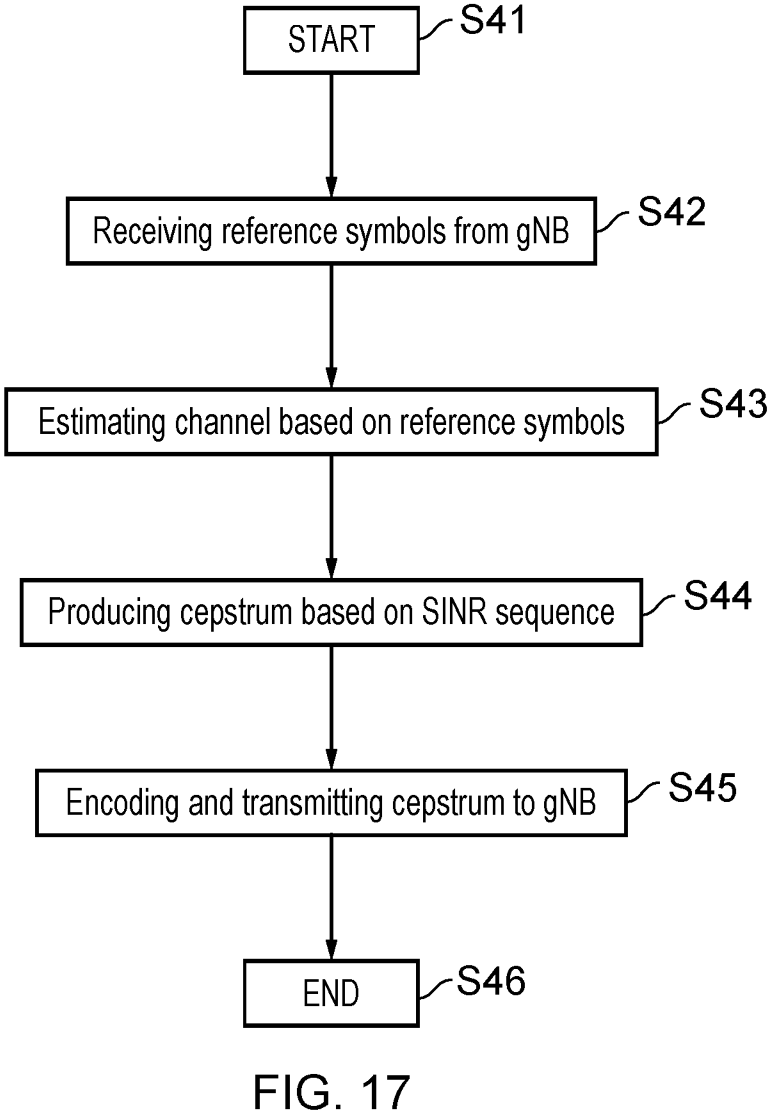
FIG. 17 shows a flow diagram illustrating a fourth example process of communications in a communications system in which a communications device receives data from an infrastructure equipment in accordance with embodiments of the present technique.

FIG. 17 shows a flow diagram illustrating a fourth example process of communications in a communications system in which a communications device receives data from an infrastructure equipment in accordance with embodiments of the present technique. FIG. 17 is a method of operating the UE.

The method starts in step S41. In step S42, the method comprises the UE receiving one or more reference symbols from the infrastructure equipment, and then in step S43, estimating based on the received reference symbols, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel. In step S44, the process involves performing a first transform followed by a second transform on the SINR sequence to produce a cepstrum of the SINR sequence, the second transform being an inverse of the first transform, before in step S45, encoding and transmitting the cepstrum to the infrastructure equipment. The method ends in step S46.

As described above and herein, the transmitting entity may be one of a communications device (i.e. UE) and a network infrastructure equipment (i.e. BS/eNB/gNB), and the receiving entity may be the other of the communications device (i.e. UE) and the network infrastructure equipment (i.e. BS/eNB/gNB).

Those skilled in the art would appreciate that the methods shown by each of FIGS. 14 to 17 may be adapted in accordance with embodiments of the present technique. For example, other preliminary, intermediate, or subsequent steps as described herein may be included in the method, or the steps may be performed in any logical order. For example, in the method illustrated by FIG. 14, steps S12 and S13 may be carried out simultaneously or together in some way. The same may be true for steps S23 and S24 of the method shown in FIG. 15. Though embodiments of the present technique have been described largely by way of the example communications system shown by FIG. 13, it would be clear to those skilled in the art that they could be equally applied to other systems to those described herein. Furthermore, to the extent that the various arrangements described herein are described individually, these can be combined with any other arrangement described herein providing the two do not contradict one another.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. An infrastructure equipment forming part of a wireless communications network configured to receive data from a communications device via a communications channel between the infrastructure equipment and the communications device, comprising transceiver circuitry to transmit signals to and to receive signals from the communications device, and controller circuitry configured in combination with the transceiver circuitry to receive, from the communications device, a request for a resource allocation within which the communications device is to transmit data to the infrastructure equipment, to receive one or more reference symbols from the communications device, to estimate based on the received reference symbols, for each of a plurality of resource units, RUs, of the communications channel, a signal to interference and noise ratio, SINR, sequence of the communications channel, wherein an RU comprises time resources and frequency resources of the communications channel, and wherein each element of the SINR sequence is the SINR of one of the RUs of the communications channel, to perform a first transform followed by a second transform on the SINR sequence to produce a cepstrum of the SINR sequence, the second transform being an inverse of the first transform, and to encode and to transmit the cepstrum to the communications device.

Paragraph 2. An infrastructure equipment according to Paragraph 1, configured to perform a liftering process on the cepstrum before encoding and transmission of the cepstrum to the communications device, the liftering process comprising applying a rectangular window on the cepstrum to reduce a number of a plurality of samples of the cepstrum.

Paragraph 3. An infrastructure equipment according to Paragraph 2, wherein the rectangular window is centred on a sample of the cepstrum having a highest energy impulse from among the plurality of samples of the cepstrum.

Paragraph 4. An infrastructure equipment according to Paragraph 2 or Paragraph 3, wherein the rectangular window starts at the location of a sample of the cepstrum having a highest energy impulse from among the plurality of samples of the cepstrum.

Paragraph 5. An infrastructure equipment according to any of Paragraphs 2 to 4, wherein a width of the rectangular window is configurable by the infrastructure equipment.

Paragraph 6. An infrastructure equipment according to any of Paragraphs 2 to 5, wherein a width of the rectangular window is fixed.

Paragraph 7. An infrastructure equipment according to any of Paragraphs 1 to 6, configured to encode the cepstrum by performing an encoding process on the cepstrum before transmitting the encoded cepstrum to the communications device.

Paragraph 8. An infrastructure equipment according to Paragraph 7, wherein the encoding process comprises performing a direct quantisation operation on a plurality of samples of the cepstrum.

Paragraph 9. An infrastructure equipment according to Paragraph 7 or Paragraph 8, wherein the encoding process comprises performing a differential quantisation operation on a plurality of samples of the cepstrum.

Paragraph 10. An infrastructure equipment according to any of Paragraphs 7 to 9, wherein the encoding process comprises converting the cepstrum to polar form and performing separate quantisation operations on the amplitude and the phase of the converted cepstrum.

Paragraph 11. An infrastructure equipment according to any of Paragraphs 7 to 10, wherein the encoding process comprises determining which of a plurality of samples of the cepstrum have an energy impulse substantially equal to zero, and performing a quantisation operation on only samples of the cepstrum having a non-zero energy impulse.

Paragraph 12. An infrastructure equipment according to any of Paragraphs 7 to 11, wherein the encoding process comprises performing a vector quantisation operation on the cepstrum.

Paragraph 13. An infrastructure equipment according to any of Paragraphs 1 to 12, configured to determine a resource allocation of the communications channel, based on the SINR sequence, for the communications device to transmit the data to the infrastructure equipment, and to transmit, to the communications device, an indication of the resource allocation.

Paragraph 14. An infrastructure equipment according to Paragraph 13, wherein the indication of the resource allocation is for use by the communications device in combination with the encoded and transmitted cepstrum in determining which of a plurality of modulation schemes is to be used by the communications device for each of the RUs of the resource allocation.

Paragraph 15. An infrastructure equipment according to Paragraph 14, wherein each of the RUs of the resource allocation is formed of one or more Orthogonal Frequency Division Multiplexing, OFDM, symbols.

Paragraph 16. An infrastructure equipment according to Paragraph 14 or Paragraph 15, wherein each of the RUs of the resource allocation are formed of one or more resource elements, REs.

Paragraph 17. An infrastructure equipment according to any of Paragraphs 14 to 16, wherein each of the RUs of the resource allocation are formed of one or more physical resource blocks, PRBs.

Paragraph 18. An infrastructure equipment according to any of Paragraphs 14 to 17, configured to receive the data from the communications device within the resource allocation in accordance with the determined modulation schemes.

Paragraph 19. A method of operating an infrastructure equipment forming part of a wireless communications network configured to receive data from a communications device via a communications channel between the infrastructure equipment and the communications device, the method comprising receiving, from the communications device, a request for a resource allocation within which the communications device is to transmit data to the infrastructure equipment, receiving one or more reference symbols from the communications device, estimating based on the received reference symbols, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, performing a first transform followed by a second transform on the SINR sequence to produce a cepstrum of the SINR sequence, the second transform being an inverse of the first transform, and encoding and transmitting the cepstrum to the communications device.

Paragraph 20. Circuitry for an infrastructure equipment forming part of a wireless communications network configured to receive data from a communications device via a communications channel between the circuitry and the communications device, the circuitry comprising transceiver circuitry to transmit signals to and to receive signals from the communications device, and controller circuitry configured in combination with the transceiver circuitry to receive, from the communications device, a request for a resource allocation within which the communications device is to transmit data to the infrastructure equipment, to receive one or more reference symbols from the communications device, to estimate based on the received reference symbols, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, to perform a first transform followed by a second transform on the SINR sequence to produce a cepstrum of the SINR sequence, the second transform being an inverse of the first transform, and to encode and to transmit the cepstrum to the communications device.

Paragraph 21. A communications device forming part of a wireless communications network configured to transmit data to an infrastructure equipment via a communications channel between the communications device and the infrastructure equipment, comprising transceiver circuitry to transmit signals to and to receive signals from the infrastructure equipment, and controller circuitry configured in combination with the transceiver circuitry to determine that the communications device has data to transmit to the infrastructure equipment, to transmit, to the infrastructure equipment, a request for a resource allocation within which the communications device is to transmit the data to the infrastructure equipment, to transmit one or more reference symbols to the infrastructure equipment, the reference symbols being for use by the infrastructure equipment in estimating, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, and to receive, from the infrastructure equipment, an encoded cepstrum of the SINR sequence, the cepstrum having been produced by the infrastructure equipment by performing a first transform followed by a second transform on the SINR sequence, the second transform being an inverse of the first transform.

Paragraph 22. A communications device according to Paragraph 21, configured to receive, from the infrastructure equipment, an indication of a resource allocation of the communications channel, the resource allocation being determined by the infrastructure equipment based on the SINR sequence.

Paragraph 23. A communications device according to Paragraph 22, configured to determine, based on the received indication of the resource allocation in combination with the received encoded cepstrum, which of a plurality of modulation schemes is to be used by the communications device for each of the RUs of the resource allocation.

Paragraph 24. A communications device according to Paragraph 23, wherein each of the RUs of the resource allocation is formed of one or more Orthogonal Frequency Division Multiplexing, OFDM, symbols.

Paragraph 25. A communications device according to Paragraph 23 or Paragraph 24, wherein each of the RUs of the resource allocation are formed of one or more resource elements, REs.

Paragraph 26. A communications device according to any of Paragraphs 23 to 25, wherein each of the RUs of the resource allocation are formed of one or more physical resource blocks, PRBs.

Paragraph 27. A communications device according to any of Paragraphs 23 to 26, configured to transmit the data to the infrastructure equipment within the resource allocation in accordance with the determined modulation schemes.

Paragraph 28. A method of operating a communications device forming part of a wireless communications network configured to transmit data to an infrastructure equipment via a communications channel between the communications device and the infrastructure equipment, the method comprising determining that the communications device has data to transmit to the infrastructure equipment, transmitting, to the infrastructure equipment, a request for a resource allocation within which the communications device is to transmit the data to the infrastructure equipment, transmitting one or more reference symbols to the infrastructure equipment, the reference symbols being for use by the infrastructure equipment in estimating, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, and receiving, from the infrastructure equipment, an encoded cepstrum of the SINR sequence, the cepstrum having been produced by the infrastructure equipment by performing a first transform followed by a second transform on the SINR sequence, the second transform being an inverse of the first transform.

Paragraph 29. Circuitry for a communications device forming part of a wireless communications network configured to transmit data to an infrastructure equipment via a communications channel between the circuitry and the infrastructure equipment, the circuitry comprising transceiver circuitry to transmit signals to and to receive signals from the infrastructure equipment, and controller circuitry configured in combination with the transceiver circuitry to determine that the communications device has data to transmit to the infrastructure equipment, to transmit, to the infrastructure equipment, a request for a resource allocation within which the communications device is to transmit the data to the infrastructure equipment, to transmit one or more reference symbols to the infrastructure equipment, the reference symbols being for use by the infrastructure equipment in estimating, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, and to receive, from the infrastructure equipment, an encoded cepstrum of the SINR sequence, the cepstrum having been produced by the infrastructure equipment by performing a first transform followed by a second transform on the SINR sequence, the second transform being an inverse of the first transform.

Paragraph 30. An infrastructure equipment forming part of a wireless communications network configured to transmit data to a communications device via a communications channel between the infrastructure equipment and the communications device, comprising transceiver circuitry to transmit signals to and to receive signals from the communications device, and controller circuitry configured in combination with the transceiver circuitry to determine that the infrastructure equipment has data to transmit to the communications device, to transmit one or more reference symbols to the communications device, the reference symbols being for use by the communications device in estimating, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, and to receive, from the communications device, an encoded cepstrum of the SINR sequence, the cepstrum having been produced by the communications device by performing a first transform followed by a second transform on the SINR sequence, the second transform being an inverse of the first transform.

Paragraph 31. An infrastructure equipment according to Paragraph 30, configured to determine, based on the received encoded cepstrum, a resource allocation of the communications channel for the infrastructure equipment to transmit the data to the communications device, and to transmit, to the communications device, an indication of the resource allocation.

Paragraph 32. An infrastructure equipment according to Paragraph 31, configured to determine, based on the resource allocation in combination with the received encoded cepstrum, which of a plurality of modulation schemes is to be used by the infrastructure equipment for each of the RUs of the resource allocation.

Paragraph 33. An infrastructure equipment according to Paragraph 32, wherein each of the RUs of the resource allocation is formed of one or more Orthogonal Frequency Division Multiplexing, OFDM, symbols.

Paragraph 34. An infrastructure equipment according to Paragraph 32 or Paragraph 33, wherein each of the RUs of the resource allocation are formed of one or more resource elements, REs.

Paragraph 35. An infrastructure equipment according to any of Paragraphs 32 to 34, wherein each of the RUs of the resource allocation are formed of one or more physical resource blocks, PRBs.

Paragraph 36. An infrastructure equipment according to any of Paragraphs 32 to 35, configured to transmit the data to the communications device within the resource allocation in accordance with the determined modulation schemes.

Paragraph 37. A method of operating an infrastructure equipment forming part of a wireless communications network configured to transmit data to a communications device via a communications channel between the infrastructure equipment and the communications device, the method comprising determining that the infrastructure equipment has data to transmit to the communications device, transmitting one or more reference symbols to the communications device, the reference symbols being for use by the communications device in estimating, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, and receiving, from the communications device, an encoded cepstrum of the SINR sequence, the cepstrum having been produced by the communications device by performing a first transform followed by a second transform on the SINR sequence, the second transform being an inverse of the first transform.

Paragraph 38. Circuitry for an infrastructure equipment forming part of a wireless communications network configured to transmit data to a communications device via a communications channel between the circuitry and the communications device, the circuitry comprising transceiver circuitry to transmit signals to and to receive signals from the communications device, and controller circuitry configured in combination with the transceiver circuitry to determine that the infrastructure equipment has data to transmit to the communications device, to transmit one or more reference symbols to the communications device, the reference symbols being for use by the communications device in estimating, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, and to receive, from the communications device, an encoded cepstrum of the SINR sequence, the cepstrum having been produced by the communications device by performing a first transform followed by a second transform on the SINR sequence, the second transform being an inverse of the first transform.

Paragraph 39. A communications device forming part of a wireless communications network configured to receive data from an infrastructure equipment via a communications channel between the communications device and the infrastructure equipment, comprising transceiver circuitry to transmit signals to and to receive signals from the infrastructure equipment, and controller circuitry configured in combination with the transceiver circuitry to receive one or more reference symbols from the infrastructure equipment, to estimate based on the received reference symbols, for each of a plurality resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, to perform a first transform followed by a second transform on the SINR sequence to produce a cepstrum of the SINR sequence, the second transform being an inverse of the first transform, and to encode and to transmit the cepstrum to the infrastructure equipment.

Paragraph 40. A communications device according to Paragraph 39, configured to perform a liftering process on the cepstrum before encoding and transmitting the cepstrum to the infrastructure equipment, the liftering process comprising applying a rectangular window on the cepstrum to reduce a number of a plurality of samples of the cepstrum.

Paragraph 41. A communications device according to Paragraph 40, wherein the rectangular window is centred on a sample of the cepstrum having a highest energy impulse from among the plurality of samples of the cepstrum.

Paragraph 42. A communications device according to Paragraph 40 or Paragraph 41, wherein the rectangular window starts at the location of a sample of the cepstrum having a highest energy impulse from among the plurality of samples of the cepstrum.

Paragraph 43. A communications device according to any of Paragraphs 40 to 42, wherein a width of the rectangular window is configurable by the communications device.

Paragraph 44. A communications device according to any of Paragraphs 40 to 43, wherein a width of the rectangular window is fixed.

Paragraph 45. A communications device according to any of Paragraphs 39 to 44, configured to encode the cepstrum by performing an encoding process on the cepstrum before transmitting the cepstrum to the infrastructure equipment.

Paragraph 46. A communications device according to Paragraph 45, wherein the encoding process comprises performing a direct quantisation operation on a plurality of samples of the cepstrum.

Paragraph 47. A communications device according to Paragraph 45 or Paragraph 46, wherein the encoding process comprises performing a differential quantisation operation on a plurality of samples of the cepstrum.

Paragraph 48. A communications device according to any of Paragraphs 45 to 47, wherein the encoding process comprises converting the cepstrum to polar form and performing separate quantisation operations on the amplitude and the phase of the converted cepstrum.

Paragraph 49. A communications device according to any of Paragraph 45 to 48, wherein the encoding process comprises determining which of a plurality of samples of the cepstrum have an energy impulse substantially equal to zero, and performing a quantisation operation on only samples of the cepstrum having a non-zero energy impulse.

Paragraph 50. A communications device according to any of Paragraphs 45 to 49, wherein the encoding process comprises performing a vector quantisation operation on the cepstrum.

Paragraph 51. A communications device according to any of Paragraphs 39 to 50, configured to receive, from the infrastructure equipment, an indication of a resource allocation determined by the infrastructure equipment, based on the transmitted cepstrum, within which the communications device is to receive data from the infrastructure equipment.

Paragraph 52. A communications device according to Paragraph 51, wherein the transmitted encoded cepstrum is for use by the infrastructure equipment, in combination with the resource allocation determined by the infrastructure equipment based on the transmitted encoded cepstrum, in determining which of a plurality of modulation schemes is to be used by the infrastructure equipment for each of the RUs of the resource allocation.

Paragraph 53. A communications device according to Paragraph 52, wherein each of the RUs of the resource allocation is formed of one or more Orthogonal Frequency Division Multiplexing, OFDM, symbols.

Paragraph 54. A communications device according to Paragraph 52 or Paragraph 53, wherein each of the RUs of the resource allocation are formed of one or more resource elements, REs.

Paragraph 55. A communications device according to any of Paragraphs 52 to 54, wherein each of the RUs of the resource allocation are formed of one or more physical resource blocks, PRBs.

Paragraph 56. A communications device according to any of Paragraphs 52 to 55, configured to receive the data from the infrastructure equipment within the resource allocation in accordance with the determined modulation schemes.

Paragraph 57. A method of operating a communications device forming part of a wireless communications network configured to receive data from an infrastructure equipment via a communications channel between the communications device and the infrastructure equipment, the method comprising receiving one or more reference symbols from the infrastructure equipment, estimating based on the received reference symbols, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, performing a first transform followed by a second transform on the SINR sequence to produce a cepstrum of the SINR sequence, the second transform being an inverse of the first transform, and encoding and transmitting the cepstrum to the infrastructure equipment.

Paragraph 58. Circuitry for a communications device forming part of a wireless communications network configured to receive data from an infrastructure equipment via a communications channel between the circuitry and the infrastructure equipment, the circuitry comprising transceiver circuitry to transmit signals to and to receive signals from the infrastructure equipment, and controller circuitry configured in combination with the transceiver circuitry to receive one or more reference symbols from the infrastructure equipment, to estimate based on the received reference symbols, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, to perform a first transform followed by a second transform on the SINR sequence to produce a cepstrum of the SINR sequence, the second transform being an inverse of the first transform, and to encode and to transmit the cepstrum to the infrastructure equipment.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] 3GPP TS 38.300 v. 15.2.0 "NR; NR and NG-RAN Overall Description; Stage 2 (Release 15)", June 2018.

[2] Holma H. and Toskala A, "LTE for UMTS OFDMA and SC-FDMA based radio access", John Wiley and Sons, 2009.

[3] European Patent Application No. EP20166040.4.

[4] D. G. Childers, et al, 'The Cepstrum: A guide to processing', Proc. Of the IEEE, vol. 65, No. 10, pages 1428-1443, October 1977.

[5] European Patent Application No. EP19209541.2.

[6] R. M Gray, "Vector Quantization", IEEE ASSP Magazine, April 1984.

What is claimed is:

1. An infrastructure equipment forming part of a wireless communications network configured to receive data from a communications device via a communications channel between the infrastructure equipment and the communications device, comprising transceiver circuitry to transmit signals to and to receive signals from the communications device, and controller circuitry configured in combination with the transceiver circuitry to receive, from the communications device, a request for a resource allocation within which the communications device is to transmit data to the infrastructure equipment, to receive one or more reference symbols from the communications device, to estimate based on the received reference symbols, for each of a plurality of resource units, RUs, of the communications channel, a signal to interference and noise ratio, SINR, sequence of the communications channel, wherein an RU comprises time resources and frequency resources of the communications channel, and wherein each element of the SINR sequence is the SINR of one of the RUs of the communications channel, to perform a first transform followed by a second transform on the SINR sequence to produce a cepstrum of the SINR sequence, the second transform being an inverse of the first transform, and to encode and to transmit the cepstrum to the communications device.

2. An infrastructure equipment according to claim 1, configured to perform a liftering process on the cepstrum before encoding and transmission of the cepstrum to the communications device, the liftering process comprising applying a rectangular window on the cepstrum to reduce a number of a plurality of samples of the cepstrum based on a sample of the cepstrum having a highest energy impulse from among the plurality of samples of the cepstrum.

3. An infrastructure equipment according to claim 2, wherein the rectangular window is centred on the sample of the cepstrum having the highest energy impulse from among the plurality of samples of the cepstrum.

4. An infrastructure equipment according to claim 2, wherein the rectangular window starts at the location of the sample of the cepstrum having the highest energy impulse from among the plurality of samples of the cepstrum.

5. An infrastructure equipment according to claim 2, wherein a width of the rectangular window is configurable by the infrastructure equipment.

6. An infrastructure equipment according to claim 2, wherein a width of the rectangular window is fixed.

7. An infrastructure equipment according to claim 1, configured to encode the cepstrum by performing an encoding process including a quantisation operation on the cepstrum before transmitting the encoded cepstrum to the communications device.

8. An infrastructure equipment according to claim 7, wherein the encoding process including the quantisation operation further comprises performing a direct quantisation operation on a plurality of samples of the cepstrum.

9. An infrastructure equipment according to claim 7, wherein the encoding process including the quantisation operation further comprises performing a differential quantisation operation on a plurality of samples of the cepstrum.

10. An infrastructure equipment according to claim 7, wherein the encoding process including the quantisation operation further comprises converting the cepstrum to polar form and performing separate quantisation operations on the amplitude and the phase of the converted cepstrum.

11. An infrastructure equipment according to claim 7, wherein the encoding process including the quantisation operation further comprises determining which of a plurality of samples of the cepstrum have an energy impulse substantially equal to zero, and performing the quantisation operation on only samples of the cepstrum having a non-zero energy impulse.

12. An infrastructure equipment according to claim 7, wherein the encoding process including the quantisation operation further comprises performing a vector quantisation operation on the cepstrum.

13. An infrastructure equipment according to claim 1, configured to determine a resource allocation of the communications channel, based on the SINR sequence, for the communications device to transmit the data to the infrastructure equipment, and to transmit, to the communications device, an indication of the resource allocation for use by the communications device in determining a plurality of modulation schemes.

14. An infrastructure equipment according to claim 13, wherein the indication of the resource allocation is for use by the communications device in combination with the encoded and transmitted cepstrum in determining which of the plurality of modulation schemes is to be used by the communications device for each of the RUs of the resource allocation.

15. An infrastructure equipment according to claim 14, wherein each of the RUs of the resource allocation is formed of one or more Orthogonal Frequency Division Multiplexing, OFDM, symbols.

16. An infrastructure equipment according to claim 14, wherein each of the RUs of the resource allocation are formed of one or more resource elements, REs.

17. An infrastructure equipment according to claim 14, wherein each of the RUs of the resource allocation are formed of one or more physical resource blocks, PRBs.

18. An infrastructure equipment according to claim 14, configured to receive the data from the communications device within the resource allocation in accordance with the determined modulation schemes.

19. A method of operating an infrastructure equipment forming part of a wireless communications network configured to receive data from a communications device via a communications channel between the infrastructure equipment and the communications device, the method comprising receiving, from the communications device, a request for a resource allocation within which the communications device is to transmit data to the infrastructure equipment, receiving one or more reference symbols from the communications device, estimating based on the received reference symbols, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, performing a first transform followed by a second transform on the SINR sequence to produce a cepstrum of the SINR sequence, the second transform being an inverse of the first transform, and encoding and transmitting the cepstrum to the communications device.

20. A communications device forming part of a wireless communications network configured to transmit data to an infrastructure equipment via a communications channel between the communications device and the infrastructure equipment, comprising transceiver circuitry to transmit signals to and to receive signals from the infrastructure equipment, and controller circuitry configured in combination with the transceiver circuitry to determine that the communications device has data to transmit to the infrastructure equipment, to transmit, to the infrastructure equipment, a request for a resource allocation within which the communications device is to transmit the data to the infrastructure equipment, to transmit one or more reference symbols to the infrastructure equipment, the reference symbols being for use by the infrastructure equipment in estimating, for each of a plurality of resource units, RUs, of the communications channel, a signal to interference and noise ratio, SINR, sequence of the communications channel, wherein each RU comprises time resources and frequency resources of the communications channel, and wherein each element of the SINR sequence is the SINR of one of the RUs of the communications channel, and to receive, from the infrastructure equipment, an encoded cepstrum of the SINR sequence, the cepstrum having been produced by the infrastructure equipment by performing a first transform followed by a second transform on the SINR sequence, the second transform being an inverse of the first transform.

* * * * *